United States Patent [19]

Yamaguchi et al.

[11] 4,418,387
[45] Nov. 29, 1983

[54] METHOD OF RECONSTRUCTING A COMPUTED TOMOGRAPHIC IMAGE FROM A SINGLE X-RAY PROJECTION

[75] Inventors: Shoichiro Yamaguchi; Fujio Kobayashi, both of Tokyo, Japan

[73] Assignee: The President of Tokyo Institute of Technology, Tokyo, Japan

[21] Appl. No.: 186,425

[22] Filed: Sep. 12, 1980

[30] Foreign Application Priority Data

Sep. 18, 1979 [JP] Japan .............................. 54-119927
Nov. 20, 1979 [JP] Japan .............................. 54-150218
Nov. 21, 1979 [JP] Japan .............................. 54-151286
Nov. 21, 1979 [JP] Japan .............................. 54-151287

[51] Int. Cl.³ ........................................ G06F 15/42
[52] U.S. Cl. .................................. 364/414; 378/901
[58] Field of Search .......................... 364/414, 515; 250/445 T, 445 R, 363 S, 363 R; 378/4, 901

[56] References Cited

U.S. PATENT DOCUMENTS

| | | | |
|---|---|---|---|
| 4,064,393 | 12/1977 | Pasedach et al. | 364/414 |
| 4,189,775 | 2/1980 | Inouye et al. | 364/515 |
| 4,205,375 | 5/1980 | Inouye et al. | 364/414 |
| 4,219,876 | 8/1980 | Mizutani et al. | 364/414 |
| 4,274,140 | 6/1981 | Watson | 364/414 |
| 4,275,444 | 6/1981 | Ryan | 364/414 |

Primary Examiner—Gary Chin
Attorney, Agent, or Firm—Robert E. Burns; Emmanuel J. Lobato; Bruce L. Adams

[57] ABSTRACT

A method of reconstructing a computed tomographic image comprising projecting X-rays through material to be tested at a plurality of spaced positions, and measuring the X-ray density values of the X-rays projected through the material along the distribution of projected X-rays. The spaced positions at which the X-ray density values are measured are selected such that the tomographic plane of the material to be reconstructed is represented by a pseudo-tomographic plane comprised of an array of n rows of m columns of picture elements, each having a single piece of X-ray density information, and such that each X-ray beam passes through the lower left corner of a corresponding picture element. The X-ray absorption coefficient for each picture element is calculated from the measured values of X-ray density, and the computed tomographic image is reconstructed by positioning picture elements having the computed X-ray absorption coefficients in an array corresponding to the array in the pseudo-tomographic plane.

8 Claims, 11 Drawing Figures

METHOD OF RECONSTRUCTING A COMPUTED TOMOGRAPHIC IMAGE FROM A SINGLE X-RAY PROJECTION

DETAILED DESCRIPTION OF THE INVENTION

This invention relates to a reconstruction method of a X-ray computed tomographic image, and more particularly to such a method as X-ray computed tomography may be reconstructed by performing a desired calculation.

In general, there has been widely used a testing procedure by X-ray for checking internal structure of a product or a human body in the field of industry and medicine. In view of this fact, X-ray computed tomography (hereinafter abbreviated as "CT") has been extensively developed for realizing a device capable of inspecting the internal structure of products or the human body.

BACKGROUND OF THE INVENTION

In this type of a conventional X-ray computed tomography, as shown in FIG. 1 by a solid line, a projectional distribution of X-ray is measured by X-ray detector c in such a way as that an X-ray beam is projected from X-ray source a toward X-ray tested tissue b. Then, as shown in FIG. 1 by a dotted line, X-ray source a and X-ray detector c are rotated by a desired angle of α (for example 1°), and at this position the X-ray beam is projected again toward X-ray tested tissue b, a projectional distribution of X-ray under the rotation of an angle of α is measured again, and several (60 to 360) times similar operations are performed. Thereafter, data provided by these many projectional distributions of X-ray are calculated by Fourier transform or a convolution method, and a tomographic image of the X-ray tested tissue b is reproduced on the basis of a result of the processing.

However, in this type of a conventional X-ray computed tomography, it is necessary to have many projectional distributions of X-ray in order to reproduce a tomographic image of X-ray tested tissue b, resulting in providing some problems as follows:

(1) Since a long period of time is needed (several seconds to several minutes) for sampling data, it is not possible to reproduce a tomography of a moving tested tissue b.

(2) Exposure to X-ray shows a high value, resulting in that some bad effects might be applied to the tested tissue when the tested tissue b is a living thing such as a human body.

The present invention is provided to overcome these disadvantages and its object is to provide a reconstruction method of reconstructing an X-ray computed tomographic image, in which a reconstruction image having a high accuracy or precision may be produced by using a single projectional distribution of X-ray as data for reconstructing a tomographic image of the tested tissue.

SUMMARY OF THE INVENTION

According to the present invention a computed tomographic image is reconstructed using a single X-ray projection. A plurality of values of X-ray density are measured on the projectional distribution of X-rays which have passed through tissue or an object being tested. Next, the X-ray absorption coefficients for each of the picture elements is calculated based on the measured values of X-ray density and length of X-ray beams passing through the respective picture elements. The picture elements for which an X-ray absorption coefficient has been calculated are then ordered in a pseudo-tomographic plane and the array of ordered picture elements is displayed.

In view of the facts described above, the following effects or advantages may be provided by the method of reconstructing a X-ray computed tomographic image.

(1) Since it is possible to reconstruct a tomographic image of X-ray tested tissue B from a single projectional distribution D, an extremely short period of time for sampling data (less than 30 millisecond) may be made and therefore it is also possible to have a reconstruction of a clear tomographic image of a moving X-ray tested tissue B (for example, a heart).

(2) Since X-ray exposure is extremely small (several tenths or several hundredths compared to a conventional method), no bad effect may be provided even if X-ray tested tissue B is a living thing.

(3) Since it is possible to calculate each of the X-ray absorption coefficients of u picture elements for each of the groups of picture elements constituted by the number u pieces of picture elements in reference to a group of measured values constituted by the number of measured values greater than the number u, it is possible to decrease substantially the data required for one processing operation, simplify substantially the data processing, and make a data processing apparatus small and low cost.

(4) Since a tomographic image of X-ray is reconstructed in reference to the number of measured values greater than the number of picture elements u constituting a group of picture elements forming a parallel plane of a tomographic plane containing X-ray tested tissue B, it is possible to provide a substantial increase of precision of reconstruction.

BRIEF DESCRIPTION OF THE DRAWINGS

In reference to the accompanying drawings, some preferred embodiments of the present invention will be described.

FIGS. 2 to 4 illustrate a reconstruction method of X-ray computed tomography of a first preferred embodiment of the present invention wherein FIG. 2 is a schematic illustration for showing means for measuring a projectional distribution of X-ray, FIG. 3 is a block diagram to show the interconnections among the functional elements within the system, and FIG. 4 is a schematic view for illustrating the operation of the system.

DESCRIPTION OF THE PREFERRED EMBODIMENTS OF THE INVENTION

Figure 1:
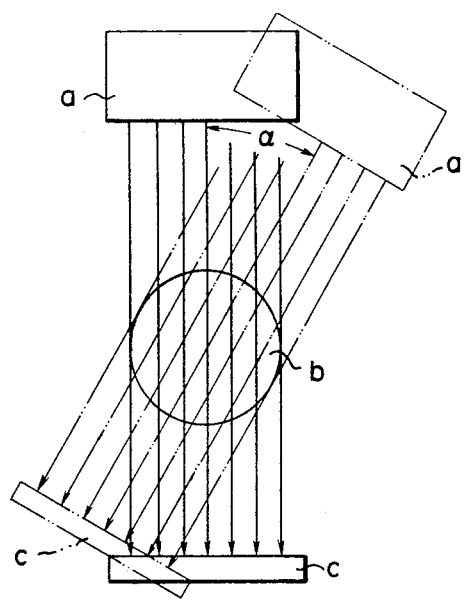
FIG. 1 is a schematic view for showing a positional relationship of a X-ray source, X-ray tested tissue and a X-ray detector.
Figure 2:
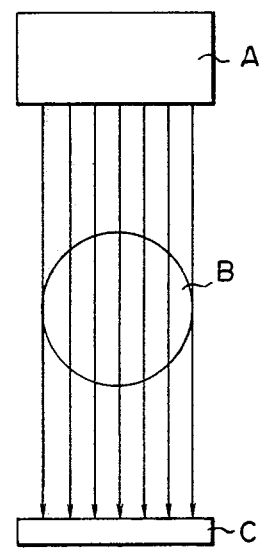
Figure 3:
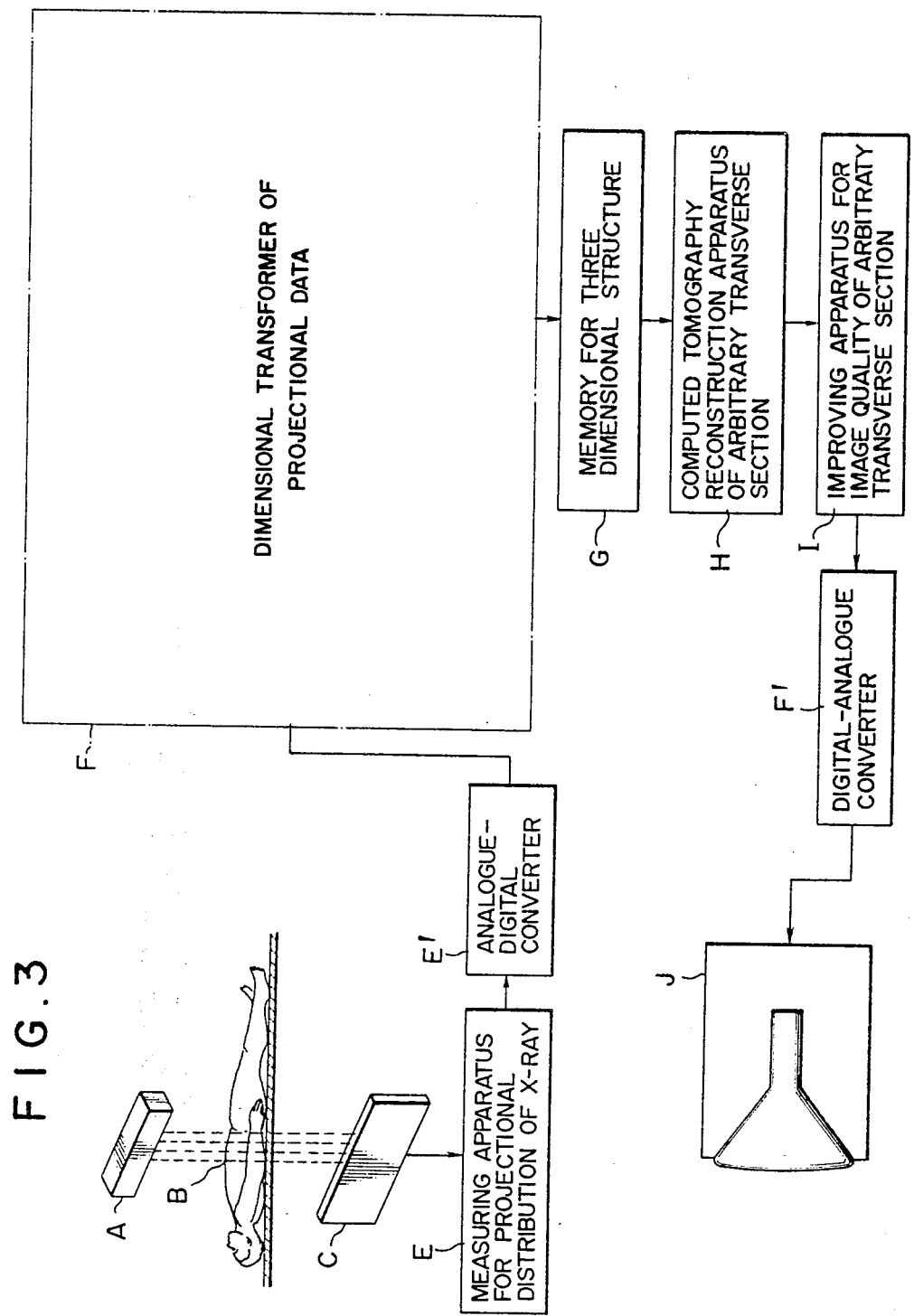
Figure 4:
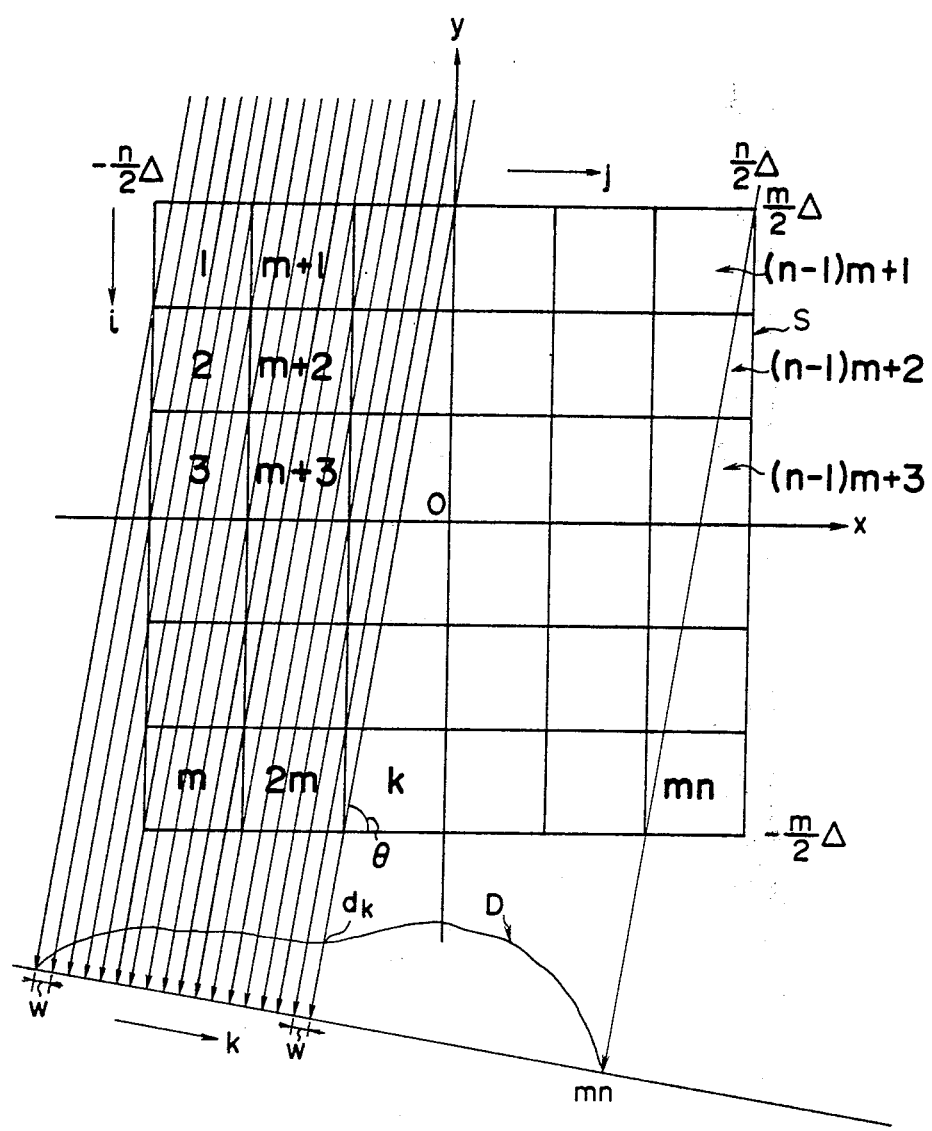

In the first preferred embodiment of the present invention illustrated in FIGS. 2 to 4, since X-ray tested tissue B is to be positioned between X-ray source A and X-ray detector C, X-ray may be projected from a desired direction toward X-ray tested tissue B, and a single projectional distribution D of X-ray (see FIG. 4) may be produced by X-ray passed through X-ray tested tissue B. This X-ray source A is a device capable of producing X-ray having a quality (a transmittance power) and a dose which are suitable for X-ray tested tissue B forming an object to be inspected wherein a wave length of the produced X-ray is proportional to a voltage applied, and a dose of X-ray is determined in reference to a wavelength of X-ray.

Applied voltage is varied in accordance with the actual application, in a range of 50,000 to 120,000 volts for a medical diagnosis and a range of 100,000 to 300,000 volts for a non-destructive testing.

X-ray tested tissue B is one which is to be radiated by X-ray and its distribution of transmitted dose (projectional distribution of X-ray) is measured and thereby the image at a desired plane of tomography is to be reconstructed. For example, in a medical diagnosis the tissue is a human body (in general a living thing), and in a non-destructive test, it is a so-called industrial product.

Further, as a X-ray detector C, there are used devices such as a X-ray film, a scintillation detector, a semi conductor sensor or a xeon gas sensor etc.

Then, a single data D of projectional distribution of X-ray detected by X-ray detector C is constructed such that each of the values $d_k$ at the positions k of the mn positions equally spaced apart from each other by a distance w by a measuring apparatus E for projectional distribution of X-ray from one end of said projectional distribution D of X-ray to the other end thereof (see FIG. 4).

As the measuring apparatus E for projectional distribution of X-ray, when X-ray detector C is a X-ray film, a microdensitometer is used for measuring a plurality of values on a distribution of density of X-ray (so-called roentgenograph) which is obtained on X-ray film as a dark or light pattern.

In this way, as apparatus for measuring each of the values $d_k$ at a plurality of positions k equally spaced apart by a distance w from each other starting from one end of the projectional distribution D of X-ray to the other end thereof, a scintillation detector is used in addition to the examples described above for producing a signal corresponding to a density of X-ray in which X-ray detector C receives X-ray transmitted through X-ray tested tissue B. In this case, one unit of a scintillation detector and a mechanism for moving the detector from one end of said projectional distribution D to the other end thereof are combined with each other or a number of detectors scintillater are arranged over the entire width of the projectional distribution D.

Also in case the X-ray detector C is made of a semi conductor type detector which will produce a signal corresponding to a density of X-ray after receiving X-ray transmitted through X-ray tested tissue B, one semi-conductor detector and a mechanism for moving the detector are combined with each other or a number of semi conductor detectors are arranged in the same manner as the case in which the scintillation detector described above is applied as apparatus for measuring each of the values $d_k$.

In case that X-ray detector C is made of xeon gas detector, one xeon gas detector and a mechanism for moving the detector are combined with each other or a number of xeon gas detectors are arranged in the same manner as that the above described scintillation detector or a semi conductor detector is applied as apparatus for measuring each of the values $d_k$.

The signal produced by the measuring apparatus E for projectional distribution of X-ray in this way is an analogue signal, so that this signal is transformed to a digital signal by an analogue-digital converter E' (hereinafter called as "A/D converter") in order to apply the signal to a digital computer, and then the signal is stored in a disk etc.

Thereby, the apparatus for measuring density of X-ray is constituted in that a plurality of values $d_k$ on the single projectional distribution D produced by projecting X-ray from a desired direction toward X-ray tested tissue B may be measured by said measuring apparatus E for projectional distribution of X-ray or A/D converter E' etc.

Then, the data output $d_k$ (a digital signal) produced from the apparatus for measuring density of X-ray is fed to a dimensional transformer F or projectional data constituting the apparatus for calculating X-ray absorption coefficient.

The dimensional transformer F of projectional data comprises an address control 10, to which the output $d_k$ from the analogue-digital converter E' is fed, a projection data memory 11 memorizing the output $d_k$ from the address control 10, a coefficient generator 12 generating the necessary coefficient (this coefficient corresponds to the length of the object which has the X-ray absorption coefficient $\mu_k$) for calculating the X-ray absorption coefficient $\mu_k$, a multiplier 13 multiplying the output from the projection data memory 11 by the output from the coefficient generator 12, an accumulator 14 summing up the output from the multiplier 13, and a reconstruction data memory 15 memorizing X-ray absorption coefficient $\mu_k$ for reconstruction of X-ray computed tomography based on the output from the accumulator 14. By the above-described dimensional transformer F of projectional data, data output $d_k$ from the analogue-digital converter E' is memorized in the projection data memory 11 through the address control 10 while an address signal is fed to the projection data memory 11, the coefficient generator 12, and the reconstruction data memory 15. Therefore X-ray absorption coefficient $\mu_k$ is calculated based on the data in the corresponding addresses in the projection data memory 11 and the coefficient generator 12, and it is stored in the corresponding address in the reconstruction data memory 15.

This dimensional transformer F of projectional data may produce upon calculation a signal corresponding to each X-ray absorption coefficients $\mu_k$ (two dimensional data) of mn picture elements constituting a pseudo-tomographic plane S containing a plane of tomography of X-ray tested tissue B on the basis of the digital data output $d_k$ (one dimensional data) produced from the apparatus for measuring density of X-ray, so that as its practical embodiment, a digital computer storing a desired program may be used.

A calculation method will be described as follows in which each of X-ray absorption coefficients $\mu_k$ (two dimensional data) of mn picture elements as a component of the pseudo-tomographic plane S containing a tomographic plane of X-ray tested tissue B is calculated in reference to each of the mn values $d_k$ (one dimensional data) on a single projectional distribution of X-ray D.

As shown in FIG. 4, assuming that there are mn unit X-ray beams, a pseudotomographic plane S is defined such that a position of each of the picture elements is determined in such a way as the first unit X-ray beam is passed through a left lower corner of the first picture element to the X-ray detector C, and similarly in sequence until the mn-th unit X-ray beam is passed through the left lower corner of the mn-th picture element to the X-ray detector C. In this case, a unit X-ray beam is assumed such that relative spaces w between each of the unit X-ray beams are made to be equal.

In this way, since the first unit X-ray beam is passed through only the first picture element, it is possible to calculate a X-ray absorption coefficient $\mu_1$ if a relation between X-ray density $d_1$ produced by the first unit X-ray beam and X-ray absorption coefficient $\mu_1$ of the first picture element is known.

Further, since the second unit X-ray beam is passed through only the first end second picture elements, X-ray density $d_2$ produced by the second unit X-ray beam has both information of each of the X-ray absorption coefficients $\mu_1$ and $\mu_2$ of the first and second picture elements. However, as described above, since the X-ray absorption coefficient $\mu_1$ of the first picture element is already known, the X-ray absorption coefficient $\mu_2$ of the second picture element is also known.

It is possible to calculate up to the X-ray absorption coefficient of the mn-th picture element by providing a repetition of the similar operation in sequence. Due to this, if a value of X-ray absorption coefficient of each of the picture elements is applied, it is possible to reproduce at once a tomography of X-ray tested tissue B.

In this way, it is possible to reconstruct the tomography of X-ray tested tissue B, and the dimensional transforming method of a quantitative one will be described in detail in reference to some mathematical equations etc. in addition to a qualitive description of dimensional transforming of projectional data as described heretofore.

At first, it is assumed that a pseudtomographic plane S of a reconstructional plane of the tomography of X-ray tested tissue B is constituted by mn divided small picture elements, as shown in FIG. 4, and a center of the plane S is placed at an origin of x-y coordinates.

Further, it is assumed that one picture element has the same X-ray absorption coefficient, and the numbers m and n are even number, and a size of one picture element is a square of $\Delta \times \Delta$ for convenience of description.

Further, it is assumed that every X-ray beam passing through the pseudo-plane S is projected in parallel from a direction $\theta$ fulfilling a relation of $\theta = \tan^{-1} m$, and a diameter of each of the unit X-ray beams is sufficiently small compared with that of each of the picture elements.

If it is assumed that each of the picture elements is provided with a number in accordance with the order as shown in FIG. 4, the absorption coefficient is defined by $\mu_k$, the X-ray beam is projected from a direction of $\theta$, a projection density made by the unit X-ray beam passing through a point $(x_1, y_1)$ in x-y coordinates is defined as $d_k$, and the following equation may be provided.

$$x_j = \left( -\frac{n}{2} + j - 1 \right) \cdot \Delta,$$

$$y_i = \left( \frac{m}{2} - i \right) \cdot \Delta,$$

$$k = (j-1) \cdot m + 1,$$
$$(i = 1, 2, \ldots, m, j = 1, 2, \ldots, n)$$

where, i is a row and j is a column.

$$\mathbb{L}\mu = \cdots \mathbb{D} \tag{1}$$

where, $$\mathbb{L} = \alpha \left\{ m \begin{bmatrix} 1 & 0 & 0 & 0 & \cdots & \cdots & 0 & 0 & 0 \\ 1 & 1 & 0 & & & & & & 0 \\ 1 & 1 & 1 & 0 & & & & & 0 \\ \vdots & & \ddots & \ddots & & & & & 0 \\ 1 & & & & & & & & \\ 0 & 1 & & & & & & & \\ \vdots & \ddots & & & & & & & \\ & & & & & & \ddots & 0 & 0 \\ & & & & & & 1 & 1 & 0 \\ 0 & \cdots & \cdots & 0 & 1 & 1 & 1 & \cdots & 1 & 1 \end{bmatrix} \right. \tag{2}$$

$$m$$

and where, $$\mu = (\mu_1, \mu_2, \mu_3, \ldots \mu_{mn})^T$$

$$\mathbb{D} = (d_1, d_2, d_3, \ldots d_{mn})^T$$

$\mathbb{L}$ is a square matrix, and when $i-m < j \leq i$, $l_{ij}=1$, and when $j > i$ or $i-m \geq j$, $l_{ij}=0$, then the matrix is a band matrix.

A value of $\alpha$ is a length of X-ray beam passing through the picture element, and fulfills an equation of $\alpha = \Delta\sqrt{1+\cot^2\theta}$ and the symbol $\tau$ expresses a transpose.

Resolving the equation (1), resulting in the following equation $$\left. \begin{array}{l} \mu_1 = p_1 \\ \mu_k = p_k - p_{k-1} \; (k = 2, 3, \ldots, m) \\ \mu_k = p_k - p_{k-1} + \mu_{k-m} \\ \quad (k = m+1, m+2, \ldots, mn) \end{array} \right\} \tag{3}$$

where,
$$\mathbb{P} = (p_1, p_2, p_3, \ldots p_{mn})^T = \mathbb{D}/\alpha$$

In reference to this relation, two dimensional tomographic data $\mu_k$ of the X-ray tested tissue B are calculated at once.

As described above, with an assumption that the absorption coefficient in one picture element is constant may be defined and further no measurement error is found, two dimensional tomographic data $\mu_k$ of the X-ray tested tissue B may be calculated at once in reference to the equation (3).

However, in the actual X-ray tested tissue B, it is difficult to establish the assumption described above and the equation would have some measurement errors in general. Thus, it is hard to expect a better result of the two dimensional data $\mu_k$ to be calculated by the equation (3) even if the above described assumption shows a slight difference value and a small measurement error occurs.

Thus, in order to apply a mathematical programming, non-negative correction values of $r_1, r_2, r_3 \ldots r_{mn}$ are applied. Since an absorption coefficient of X-ray beam passing through an object is generally a non-negative value and does not exceed a positive upper limit value U, the equation (1) will be expressed as follows by applying these limiting conditions.

$$\left.\begin{array}{l} l_{1\cdot1}\mu_1 + l_{1\cdot2}\mu_2 + \ldots + l_{1\cdot mn}\mu_{mn} - r_1 \leq p_1 \\ l_{1\cdot1}\mu_1 + l_{1\cdot2}\mu_2 + \ldots + l_{1\cdot mn}\mu_{mn} + r_1 \geq p_1 \\ l_{2\cdot1}\mu_1 + l_{2\cdot2}\mu_2 + \ldots + l_{2\cdot mn}\mu_{mn} - r_2 \leq p_2 \\ l_{2\cdot1}\mu_1 + l_{2\cdot2}\mu_2 + \ldots + l_{2\cdot mn}\mu_{mn} + r_2 \geq p_2 \\ \ldots \ldots \ldots \ldots \ldots \ldots \ldots \ldots \ldots \ldots \\ l_{mn\cdot1}\mu_1 + l_{mn\cdot2}\mu_2 + \ldots + l_{mn\cdot mn}\mu_{mn} - r_{mn} \leq p_{mn} \\ l_{mn\cdot1}\mu_1 + l_{mn\cdot2}\mu_2 + \ldots + l_{mn\cdot mn}\mu_{mn} + r_{mn} \geq p_{mn} \\ \mu_1 \leq U, \mu_2 \leq U, \ldots, \mu_{mn} \leq U \\ \mu_1 \geq O, \mu_2 \geq O, \ldots, \mu_{mn} \geq O \\ r_1 \geq O, r_2 \geq O, \ldots, r_{mn} \geq O \end{array}\right\} \quad (4)$$

where, when $i-m < j \leq i$ is made, $l_{ij}=1$, $j > i$ or when $j \leq i-m$ is made, $l_{ij}=0$.

Further when the non-negative slack variables $s_1, s_2, s_3 \ldots s_{3mn}$ are applied, a simultaneous linear inequality of the equation (4) will become a simultaneous linear equation.

$$\left.\begin{array}{l} l_{1\cdot1}\mu_1 + l_{1\cdot2}\mu_2 + \ldots + l_{1\cdot mn}\mu_{mn} - r_1 + s_1 = p_1 \\ l_{1\cdot1}\mu_1 + l_{1\cdot2}\mu_2 + \ldots + l_{1\cdot mn}\mu_{mn} + r_1 - s_2 = p_1 \\ l_{2\cdot1}\mu_1 + l_{2\cdot2}\mu_2 + \ldots + l_{2\cdot mn}\mu_{mn} - r_2 + s_3 = p_2 \\ l_{2\cdot1}\mu_1 + l_{2\cdot2}\mu_2 + \ldots + l_{2\cdot mn}\mu_{mn} + r_2 - s_4 = p_2 \\ \ldots \ldots \ldots \ldots \ldots \ldots \ldots \ldots \\ l_{mn\cdot1}\mu_1 + l_{mn\cdot2}\mu_2 + \ldots + l_{mn\cdot mn}\mu_{mn} \\ \quad - r_{mn} + s_{2mn-1} = p_{mn} \\ l_{mn\cdot1}\mu_1 + l_{mn\cdot2}\mu_2 + \ldots + l_{mn\cdot mn}\mu_{mn} \\ \quad + r_{mn} - s_{2mn} = p_{mn} \\ \mu_1 + s_{2mn+1} = U, \mu_2 + s_{2mn+2} = U, \ldots, \\ \mu_{mn} + s_{3mn} = U \\ \mu_1 \geq O, \mu_2 \geq O, \ldots, \mu_{mn} \geq O \\ r_1 \geq O, r_2 \geq O, \ldots, r_{mn} \geq O \\ s_1 \geq O, s_2 \geq O, \ldots, s_{3mn} \geq O \end{array}\right\} \quad (5)$$

Solution having the minimum value of the object function of $$F = \sum_{k=1}^{mn} r_k \quad (6)$$

is calculated by a mathematical programming under an equation of restrictive condition, resulting in showing the two dimensional data (optimal solution or optimum value) $\mu_k$ without any variation after the calculation is carried out a limited number of times.

In the above example, the two dimensional data $\mu_k$ has been calculated under an object function for making the minimum sum of an absolute value of the correction in the equation of restrictive condition. There is also another method in which the object function of the equation (8) is made to be the minimum one under the equation of restrictive condition of the following equation (7).

$$\left.\begin{array}{l} l_{1\cdot1}\mu_1 + l_{1\cdot2}\mu_2 + \ldots + l_{1\cdot mn}\mu_{mn} - r \leq p_1 \\ l_{1\cdot1}\mu_1 + l_{1\cdot2}\mu_2 + \ldots + l_{1\cdot mn}\mu_{mn} + r \geq p_1 \\ l_{2\cdot1}\mu_1 + l_{2\cdot2}\mu_2 + \ldots + l_{2\cdot mn}\mu_{mn} - r \leq p_2 \\ l_{2\cdot1}\mu_1 + l_{2\cdot2}\mu_2 + \ldots + l_{2\cdot mn}\mu_{mn} + r \geq p_2 \\ \ldots \ldots \ldots \ldots \ldots \ldots \ldots \ldots \\ \ldots \ldots \ldots \ldots \ldots \ldots \ldots \ldots \\ l_{mn\cdot1}\mu_1 + l_{mn\cdot2}\mu_2 + \ldots + l_{mn\cdot mn}\mu_{mn} - r \leq p \\ l_{mn\cdot1}\mu_1 + l_{mn\cdot2}\mu_2 + \ldots + l_{mn\cdot mn}\mu_{mn} + r \geq p \\ \mu_1 \leq U, \mu_2 \leq U, \ldots, \mu_{mn} \leq U \\ \mu_1 \geq O, \mu_2 \geq O, \ldots, \mu_{mn} \geq O, r \geq O \\ F = r \ldots (8) \end{array}\right\} \quad (7)$$

Upon solving the above equation, the tomographic two dimensional data $\mu_k$ of the X-ray tested tissue B is calculated under such conditions as the maximum correction value of the absolute value under the equation of the restrictive condition is made to be minimum.

Further, the calculation may also be made by a method in which an object function of $$F = \sum_{k=1}^{mn} r_k^2 \quad (9)$$

is made to be minimum under the equation of the restrictive condition of the equation (5), or a method in which an object function of $$F = r^2 \quad \ldots (10)$$

is made to be minimum under an equation of the restrictive condition of the equation (7).

The two dimensional data $\mu_k$ made in this way are transmitted to the memory for three dimensional structure G.

This memory for three dimensional structure G is a memory in which the two dimensional data $\mu_k$ for use in making the tomography transmitted from the dimensional transformer of projectional data F are stored in time sequence and the data of the three dimensional structure of the X-ray tested tissue B are calculated.

Thus, the two dimensional data $\mu_k$ transmitted at first from the dimensional transformer of projectional data F are related to a certain transverse section of X-ray tested tissue B, another projectional distribution D of X-ray may be made by changing a measuring point with the mesuring apparatus for projectional distribution of X-ray E, and the two dimensional data $\mu_k'$ relating to other sections may easily be obtained and so it will become possible to store the three dimensional structure of X-ray tested tissue B by accumulating two dimensional data $\mu_k, \mu_k', \mu_k'', \ldots$ relating to some different sections. However, in order to make a complete three dimensional structure, an interpolation etc. between each of the section data will be required, so that the present memory G may be applied as a memory device holding a calculation function.

To this memory G is connected a computed tomography reconstruction apparatus H of arbitrary transverse section. This computed tomography reconstruction apparatus H of arbitrary transverse section is such a device as the two dimensional data relating to the specified arbitrary transverse section of the X-ray tested tissue B are selectively retrieved from the data of three dimensional structure of X-ray tested tissue B stored in the memory G and thereby a tomography is reconstructed.

In this paragraph, the term of arbitrary transverse section is defined as a section which is horizontal, vertical or inclined to the X-ray tested tissue B.

The two dimensional data relating to the arbitrary tomography made by the computed tomography reconstruction apparatus of arbitrary transverse section H are mathematically calculated in response to the projectional distribution produced by the measuring apparatus E for projectional distribution of X-ray, so that if the data are transmitted to and displayed J on a display of computed tomography of arbitrary transverse section for displaying data via suitable digital-analogue converter F' (hereinafter called "D/A converter"), it is possible to reconstruct a tomography of X-ray tested tissue B. However, this tomography has such unwanted or inferior components as noise or vague picture, so that no guarantee is made for getting a proper picture image.

Therefore, in order to correct data obtained from the computed tomography reconstruction apparatus H of arbitrary transverse section, the data is fed or transmitted to an improving apparatus I for image quality of arbitrary transverse section.

This improving apparatus I for image quality of arbitrary transverse section I is made such that an image quality is improved by removing some noise, making a smoothness and a sharpness in the data of tomography of arbitrary transverse section transmitted from the computed tomography reconstruction apparatus H of arbitrary transverse section. A digital filter is used for eliminating the noise, a smoothing circuit is used for smoothing operation, and a differentiation circuit is used for amplifying a sharpness of the image.

The signal of which image quality has been improved is transmitted to display J of computed tomography of arbitrary transverse section via D/A converter F'.

The display J of computed tomography of arbitrary transverse section receives a signal transmitted from the improving apparatus I for image quality of arbitrary transverse section and displays the arbitrary tomography of X-ray tested tissue B as a visible image upon a monitor of a color or monochromatic cathode-ray tube (Braun tube), and in general the Braun tube is used as described above.

In order to reconstruct a tomography of X-ray tested tissue B by an arrangement described above, X-ray beam is projected from X-ray source A toward X-ray tested tissue B at a desired direction, each of the values $d_k$ of a single projectional distribution D of X-ray obtained by the X-ray detector C is measured at mn position k equally spaced apart from each other by a distance of w from one end of projectional distribution D of X-ray up to the other end of projectional distribution D of X-ray by using the measuring apparatus E for projectional distribution of X-ray E and thereby one dimensional data $d_k$ may be provided.

Then, these one dimensional data $d_k$ are properly converted from their analogue form to their digital form and each of X-ray absorption coefficient $\mu_k$ (two dimensional data) of the number the mn picture elements in a pseudo-tomographic plane S is calculated by the dimensional transformer of projectional data F using the above described method.

Then, the two dimensional data $\mu_k$ are reconstructed through the memory G, the computed tomography reconstruction apparatus H of arbitrary transverse section, the improving apparatus I for image quality of arbitrary transverse section and D/A converter F' and displayed by the display J of computed tomography of arbitrary transverse section as the tomography of the X-ray tested tissue B.

Figure 5:
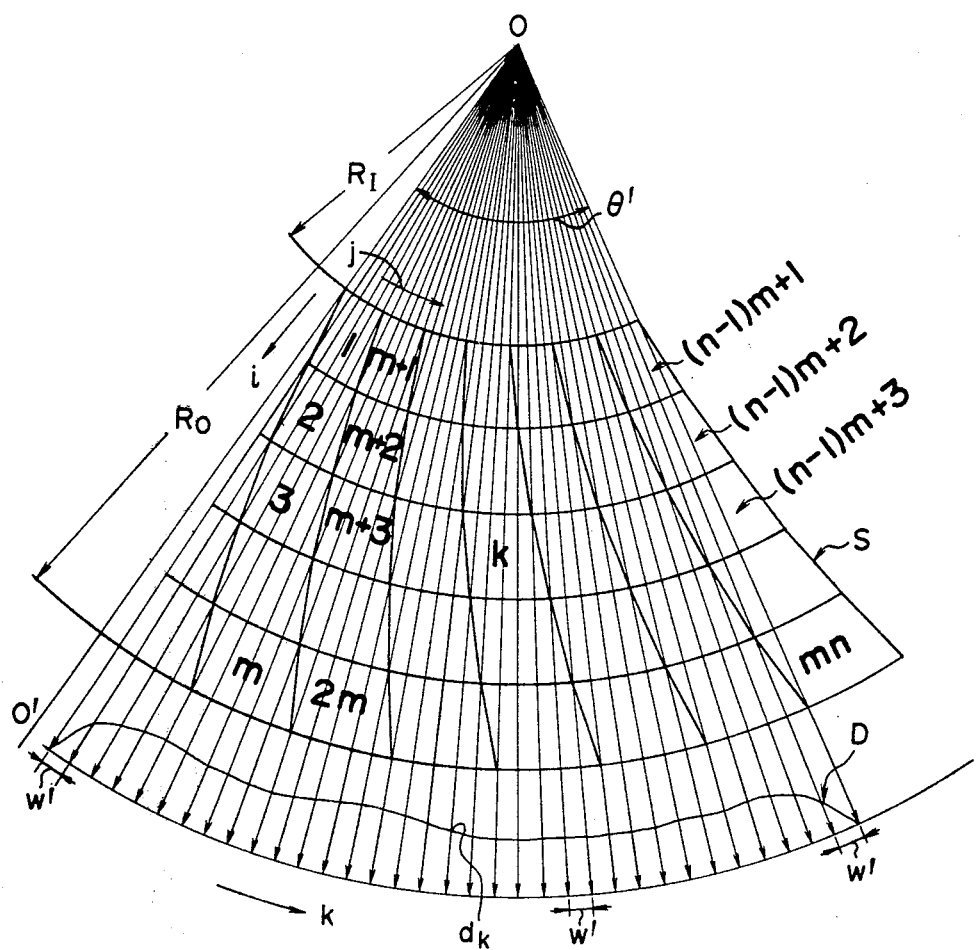
FIG. 5 is a schematic view for illustrating a reconstruction method of X-ray computed tomographic image of a second preferred embodiment of the present invention.

FIG. 5 is a schematic view for illustrating a reconstruction method of X-ray computed tomographic image of a second preferred embodiment of the present invention where the similar numbers in FIG. 5 substantially correspond to those of FIG. 4.

In the second preferred embodiment of the present invention in which the X-ray source A and the X-ray tested tissue B are closely positioned relative to each other, that is, the X-ray beam is a fan beam, two dimensional tomographic data $\mu_k$ are constructed by the picture elements of modified polar coordinates as shown in FIG. 5, resulting in forming the equation (1) and thereby the above described theory may be applied as they are.

In FIG. 5, a source of X-ray is set at an origin O, an inner radius of picture elements of polar coordinates is $R_I$, an outer radius thereof is $R_O$, and the picture elements are constituted by m×n. The picture elements have such numbers shown in FIG. 5 and a straight line passing through the pints OO' is set as a reference line for an angle.

The radii $R_1$, $R_2$ and the angles $\varphi_1$, $\varphi_2$, $\varphi_3$, and $\varphi_4$ are expressed as follows:

$$\left.\begin{aligned}
R_1 &= R_I + (i - 1)\frac{R_o - R_I}{m} \\
R_2 &= R_I + i\frac{R_o - R_I}{m} \\
\varphi_1 &= (i - 1)\frac{\theta'}{mn} + (j - 1)\frac{\theta'}{n} \\
\varphi_2 &= (i - 1)\frac{\theta'}{mn} + j\frac{\theta'}{n} \\
\varphi_3 &= \varphi_1 + \frac{\theta'}{mn} \\
\varphi_4 &= \varphi_2 + \frac{\theta'}{mn} \\
(i &= 1, 2, \ldots, m, j = 1, 2, \ldots, n)
\end{aligned}\right\} \quad (11)$$

where, if a straight line passing through the points ($R_1$, $\varphi_1$) and ($R_2$, $\varphi_3$) is $L_1$, another straight line passing through the points ($R_1$, $\varphi_2$) and ($R_2$, $\varphi_4$) is $L_2$, the picture element k shows an area enclosed by the radii $R_1$ and $R_2$ and two straight lines $L_1$ and $L_2$ and where k=i+(j−1).m,$\theta'$ is a zenith angle of the inside of polar coordinate picture element (radius of $R_1$).

Thus, even in case the X-ray beam is a fan beam, it is possible to calculate the two dimensional data $\mu_k$ from the one dimensional data $d_k$ in the same way as in the above described first preferred embodiment of parallel beams, and thereby it is possible to reconstruct the tomogrophy of X-ray tested tissue B from the single projectional distribution D.

Figure 6:
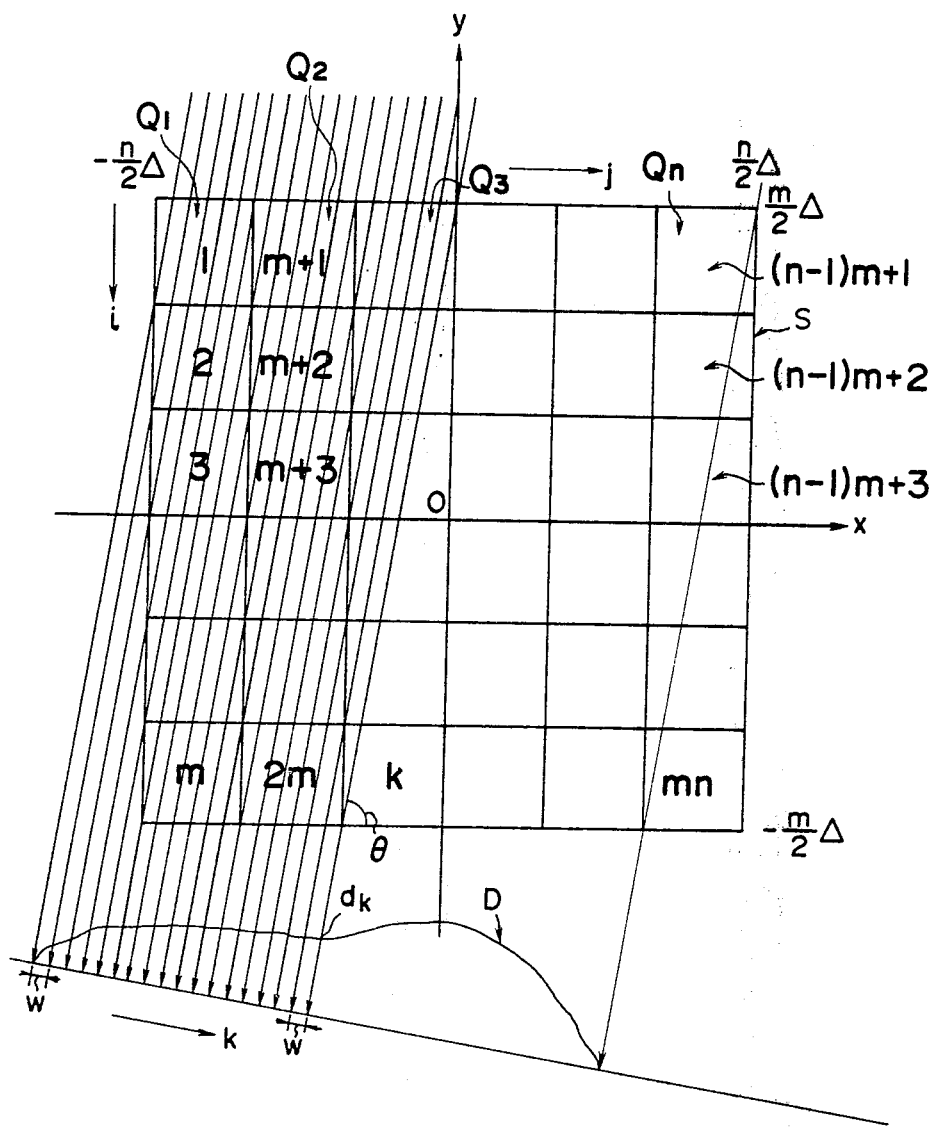
FIG. 6 is a schematic view for illustrating a reconstruction method of X-ray computed tomographic image of a third preferred embodiment of the present invention.

FIG. 6 is a schematic view for illustrating a reconstruction method of X-ray computed tomography of a third preferred embodiment of the present invention wherein the similar numbers in FIG. 6 substantially correspond to that of FIGS. 4 and 5.

In the third preferred embodiment of the present invention, n groups of measurement values (mn values in total) made at each of a plurality of positions [u(=m)] equally spaced apart in sequence by a distance w from one end of the single projectional distribution D of X-ray beam to the other end thereof which is made by projecting X-ray beam from a specified direction toward X-ray tested tissue B may be produced by the apparatus for measuring density X-ray constituted by said measuring apparatus E for projectional distribution of X-ray, and A/D converter E' etc., and further the data output (digital signals) for each group of mesurement values produced by apparatus for measuring density of X-ray means are fed in sequence to the dimensional transformer of projectional data F constituting the apparatus for calculating X-ray absorption coefficient.

The dimensional transformer F of projectional data is made such that signals corresponding to each of X-ray absorption coefficients $\mu_k$ (two dimensional data) of each of the picture elements in n groups of picture elements, where each group is constituted by the number u (=m) of picture elements are used by the number m is response to a digital data output (one dimensional data) for each of said groups of measurement values from the apparatus for measuring density of X-ray and is calculated in sequence to provide the output data, and as its practical embodiment, a digital computer storing some desired programs may be applied as in the same manner as that of each of the preferred embodiments.

Now, such a method will be decribed as that each of the X-ray absorption coefficients $\mu_k$ (two dimensional data) of the mn picture elements as the component of a pseudo-tomographic plane S (the plane S being constituted of n groups of picture elements) containing a tomographic image of X-ray tested tissue B is calculated in response to each of the groups of measurement values constituted by m measurement values $d_k$ (one dimensional data) on a single projectional distribution D of X-ray.

As shown in FIG. 6, it is assumed that mn of the unit X-ray beams are provided, and a position of each of the picture elements is defined to determine a first group $Q_1$ of the picture elements in such a way as the first unit X-ray beam is passed through a left lower corner of the first picture element up to the X-ray detector C, until the m-th unit X-ray beam is passed through the left lower corner of the m-th picture element up to the X-ray detector C.

Then, a second group $Q_2$ of the picture elements is determined by defining a position of each of the picture elements in such a way as a (m+1)-th unit X-ray beams 2m-th are passed through the left lower corner of the m+1-th picture elements to 2m-th up to the X-ray detector C, respectively.

Similarly, in sequence, third to n-th groups $Q_3$ to $Q_n$ of picture elements are determined by defining a position of each of the picture elements in such a way as each of the m-th X-ray beams is passed through the left lower part of each of the m-th picture elements up to the X-ray detector C.

In this way, the pseudo-tomographic plane S is also determined by defining the groups $Q_1$ to $Q_n$ of each of the picture elements. In this case, the unit X-ray beam is assumed such that relative spaces w of each of the unit X-ray beams are equal with each other.

In this way, since the first unit X-ray beam is passed through the first picture element only, if a relation between X-ray density $d_1$ produced by the first unit X-ray beam and X-ray absorption coefficient $\mu_1$ of the first picture element is apparent, it is possible to calculate the X-ray absorption coefficient $\mu_1$.

Further, since the second unit X-ray beam is passed through only the first and second picture elements, X-ray density $d_2$ produced by the second unit X-ray beam has both information of each of the X-ray absorption coefficients $\mu_1$ and $\mu_2$ of the first and second picture elements. However, as described above, since the X-ray absorption coefficient $\mu_1$ of the first picture element is already known, the X-ray absorption coefficient $\mu_2$ of the second picture element is also apparent.

It is possible to calculate the X-ray absorption coefficient in the M picture element by repeating the similar operation in sequence, and thereby it is also possible to calculate the X-ray absorption coefficients $\mu_1$ to $\mu_m$ of each of the picture elements 1 to m in a first group $Q_1$ of picture elements constituted by the M picture elements. Thus, the calculated X-ray absorption coefficients $\mu_1$ to $\mu_m$ are transmitted to the memory G as a storing means described below.

Further, since the (m+1)-th unit X-ray beam is passed through only the second to (m+1)-th picture elements of the X-ray density $d_{m+1}$ produced by the (m+1)-th unit X-ray beam has each of the information of each X-ray absorption coefficients $\mu_2$ to $\mu_{m+1}$ of the second to (m+1)-th picture elements. However, as described above, since the X-ray absorption coefficients $\mu_2$ to $\mu_m$ of the second to m-th picture elements of the are already known by calculating the X-ray absorption coefficients $\mu_1$ to $\mu_m$ of each of the picture elements 1 to m in the first group $Q_1$ of the picture elements, it is possible to calculate the X-ray absorption coefficient $\mu_{m+1}$ of the picture element (m+1) constituting a second group $Q_2$ of the picture elements by retrieving properly information of X-ray absorption coefficients $\mu_1$ to $\mu_m$ stored in the memory G.

Similarly in sequence, it is possible to calculate the X-ray absorption coefficients $\mu_{m+2}$ to $\mu_{2m}$ in the picture elements of (m+2) to 2m constituting a second group $Q_2$ of the picture elements by retrieving properly information from the memory G.

Further, similarly in sequence, it is possible to calculate the X-ray absorption coefficients $\mu_{2m+1}$ to $\mu_{mn}$ of each of the picture elements in the subsequent groups $Q_3$ to $Q_n$ of the third to n-th picture elements constituted by m pieces of picture elements.

In this case, if m pieces of X-ray absorption coefficients are calculated, this information is transmitted to the memory G at each of the calculations.

In this way, it is possible to calculate in sequence the X-ray absorption coefficient for each of the groups of picture elements. In addition to the qualitative description of the projectional transformation described above, a quantitive detailed description for the method of projectional transformation will be made as follows by using mathematical equations etc.

As illustrated in FIG. 6, the pseudo-tomographic plane S used as a tomographic reconstruction plane of the X-ray tested tissue B is considered as an assembly of a set of n in which a group of picture elements are used as a plane of columns of said reconstruction plane of tomography constituted by m picture elements divided into small portions. And a center of the plane S is set at an orgin of x-y coordinates.

Further, it is assumed that one picture element has the same X-ray absorption coefficient and for the sake of convenience of description, the number m and n are even number, and a size of one picture element is a square having $\Delta \times \Delta$.

X-ray beam passing through the pseudo-plane S is projected in parallel from a direction $\theta$ fulfilling a relation of $\theta = \tan^{-1} m$, and a beam diameter of each of the unit X-ray beams is sufficiently small compared with that of each of the picture elements.

When m projectional densities $d_1$ to $d_m$ are applied in order to calculate the X-ray absorption coefficients $\mu_1$ to $\mu_m$ of each of the picture elements 1 to m in the first group $Q_1$ of the picture elements, results are as follows.

$$\mathbb{L} \mu = \mathbb{D}_{Q1} \qquad (12)$$

Provided that, $$\mathbb{L} = \alpha \begin{bmatrix} 1 & & & & & & \\ 1 & 1 & & & & & \\ 1 & 1 & 1 & & & 0 & \\ \cdot & \cdot & \cdot & \cdot & & & \\ \cdot & \cdot & \cdot & \cdot & \cdot & & \\ \cdot & \cdot & \cdot & \cdot & \cdot & \cdot & \\ 1 & 1 & 1 & 1 & 1 & 1 & 1 \end{bmatrix} \qquad (13)$$

$$\mu = (\mu_1, \mu_2, \mu_3, \ldots, \mu_m)^T$$

$$\mathbb{D}_{Q1} = (d_1, d_2, d_3, \ldots d_m)^T$$

where, $\mathbb{L}$ is a square matrix of $m \times m$, $\alpha$ is a length of the X-ray beam passing through the picture elements and fulfills a relation of $\alpha = \Delta \sqrt{1 + \cot^2 \theta}$ and a symbol $T$ shows a transposition. Resolving the equation (12), results as follows:

$$\left. \begin{array}{l} \mu_1 = p_1 \\ \mu_k = p_k - p_{k-1} \ (k = 2, 3, \ldots, m) \end{array} \right\} \qquad (14)$$

Provided that,
$$\mathbb{P} = (p_1, p_2, p_3, \ldots, p_m)^t = \mathbb{D}_{Q1}/\alpha$$

in reference to the equation above, the X-ray absorption coefficients $\mu_1$ to $\mu_m$ of each of the picture elements 1 to m in the first group $Q_1$ of the picture elements are calculated.

Thus, as described above, it may be assumed that an absorption coefficient in one picture element is constant, and further when no measuring error is found, the X-ray absorption coefficients $\mu_1$ to $\mu_m$ of each of the picture elements 1 to m in the first group $Q_1$ of the picture elements are calculated in reference to the equation (14). However, in the actual X-ray tested tissue B, it is hard to have the assumption described above that an absorption coefficient in one picture element in constant and in general some measuring errors are found in them, so that it is hardly expected that the two dimensional data $\mu_1$ to $\mu_m$ calculated in reference to the equation (14) always show a better result even when the assumption that an absorption coefficient in one picture element is constant is slightly relaxed or a slight measuring error is found in the assumption.

In view of this fact, when a solution for making an object function of $$F = \sum_{k=1}^{m} r_k \qquad (15)$$

minimum under these equations of restrictive condition by applying the non-negative correction values $r_1, r_2, r_3 \ldots r_m$ or non-negative slack variables $s_1, s_2, s_3 \ldots s_{3m}$ in substantially the same restrictive conditions as that of equations (4) and (5) is calculated by a mathematical programming, and the two dimensional optimum value $\mu_1$ to $\mu_m$ are calculated without any variation after a limited number of times of calculation. Provided that the suffixes i, j for $l_{i,j}$, $\mu_j$, $r_i$, $p_i$, in equations (4) and (5) are 1, 2, 3, ... m, respectively, and the slack variables are $s_1, s_2, s_3 \ldots, s_m$, as described above.

In the above example, the two dimensional data $\mu_1$ to $\mu_m$ have been calculated on the basis of the object function for making a sum of the absolute values of the correction values under the equations of restrictive conditions minimum and there is also another way of making the object function of the above described equation (8) minimum under the equations which are substantially the same as that of the equations of restrictive conditions.

Provided that the suffixes i, j of $l_{i,j}$, $\mu_j$, $p_i$ in said equation (7) are 1, 2, 3, ... m, respectively.

Tomographic two dimensional data $\mu_1$ to $\mu_m$ are calculated under such a condition as the maximum correction value of the absolute values in the equations (7) in which the suffixes i, j of $l_{i,j}$, $\mu_j$, $p_i$ are 1, 2, 3, ..., m, respectively becomes minimum.

Further, it is also possible to calculate the relation either by a method for making an object function of $$F = \sum_{k=1}^{m} r_k^2 \qquad (16)$$

minimum under the equations of restrictive conditions of the preferred embodiment corresponding to equation (5) or by a method for making an object function of $$F = r^2 \qquad \ldots (17)$$

minimum under the equations of restrictive conditions of the preferred embodiment corresponding to equation (7).

Thus obtained two dimensional data $\mu_1$ to $\mu_m$ are tramsmitted to the memory for three dimensional structure G.

In order to calculate the X-ray absorption coefficients $\mu_{m+1}$ to $\mu_{2m}$ of each of the picture elements $(m+1)$ to $2m$ in the second group $Q_2$ of the picture elements, when the m projectional densities $d_{m+1}$ to $d_{2m}$ and the X-ray absorption coefficient just calculated are applied, it is possible to calculate m the X-ray absorption coefficients $\mu_{m+1}$ to $\mu_{2m}$ substantially in the same manner as in the equation (18).

$$\mu_k = p_k - p_{k-1} + \mu_{k-m} \cdots \qquad (18)$$

$(k = m+1, m+2, \ldots 2m)$
Provided that,
$$\mathbb{P} = (p_{m+1}, p_{m+2}, p_{m+3}, \ldots$$

$$p_{2m})^T = \mathbb{D}_{Q2}/\alpha$$

It is performed to calculate optimum X-ray absorption coefficients (tomographic two dimensional data) $\mu_{m+1}$ to $\mu_{2m}$ are calculated by applying the mathematical programming in the same manner as the case in which the X-ray absorption coefficient of each of the picture elements in the above described first group $Q_1$ of the picture elements, and then these two dimensional data $\mu_{m+1}$ to $\mu_{2m}$ are transferred to the memory G.

The similar operations are repeated in sequence to calculate the X-ray absorption coefficients of each of the picture elements in the subsequent third to n-th groups $Q_3$ to $Q_n$ of the picture elements.

Then, the memory for three dimensional structure G is made such that, as described above, each of the groups $Q_1$ to $Q_n$ of the picture elements are assembled in accordance with their relative orders after receiving a set of the m signals from the dimensional transformer of projectional data F, that is, the groups of picture element in the order of the first to n are assembled from the left side thereof in accordance with their order and thereby the signals from the dimensional transformer of projectional data F may be stored, and also the data of three dimensional structure of the X-ray tested tissue B are calculated.

The two dimensional data $\mu_k$ (k=1, 2, 3 ... mn) transmitted in sequence in a set of n by of m data from the dimensional transformer of projectional data F are related to that of a section of the X-ray tested tissue B, another projectional distribution of X-ray D' may be produced by changing a measuring point by the measuring apparatus E for projectional distribution of X-ray, and thereby the two dimensional data $\mu_k'$ relating to other sections may easily be produced substantially in the same manner as that described above, so that it is possible to store the three dimensional structure of the X-ray tested tissue B by accumulating the two dimensional data $\mu_k$, $\mu_k'$, $\mu_k''$ relating to several different sections. However, in order to construct a complete three dimensional structure, it becomes necessary to have an interpolation between each of the section data, so that the memory G may be used in the same manner as that described above as a memory device having a calculation function for it.

It is also the same as that of each of the preferred embodiments that to the memory G are connected the display of computed tomography of arbitrary transverse section J via the computed tomography reconstruction apparatus H of arbitrary transverse section, the improving apparatus I for image quality of arbitrary transverse section and D/A converter F'.

In order to produce a tomography of the X-ray tested tissue B by applying the above described arrangement, one dimensional data $d_k$ of a single projectional distribution D of X-ray detected by the X-ray D detector C by projecting at first X-ray from X-ray source A in a desired direction to the X-ray tested tissue B is calculated by measuring each of the values $d_k$ at positions k of mn positions properly spaced apart each othere by a distance w from one end of said projectional distribution D of X-ray up to the other end of said projectional distribution D of X-ray by using the measuring apparatus E for projectional distribution of X-ray.

Then, these one dimensional data $d_k$ are properly converted from their analogue form to digital form, the X-ray absorption coefficient of each of the picture elements is calculated for each of the groups of M picture elements by applying the above described method. The X-ray absorption coefficients for each of the groups of the picture elements are transmitted in sequence to the memory G and thereby each of the X-ray absorption coefficients $\mu_k$ (two dimensional data) of mn picture elements in the pseud tomographic plane S is calculated, and these X-ray absorption coefficients are stored in a specified sequence in the memory G.

Then, these two dimensional data $\mu_k$ are reconstructed and displayed from the memory G as the tomographic image of the X-ray tested tissue B by the display J computed tomography of an arbitrary transverse section via the computed tomography reconstruction apparatus M of arbitrary transverse section, the improving apparatus I for image quality of arbitrary transverse section and D/A converter F'.

Figure 7:
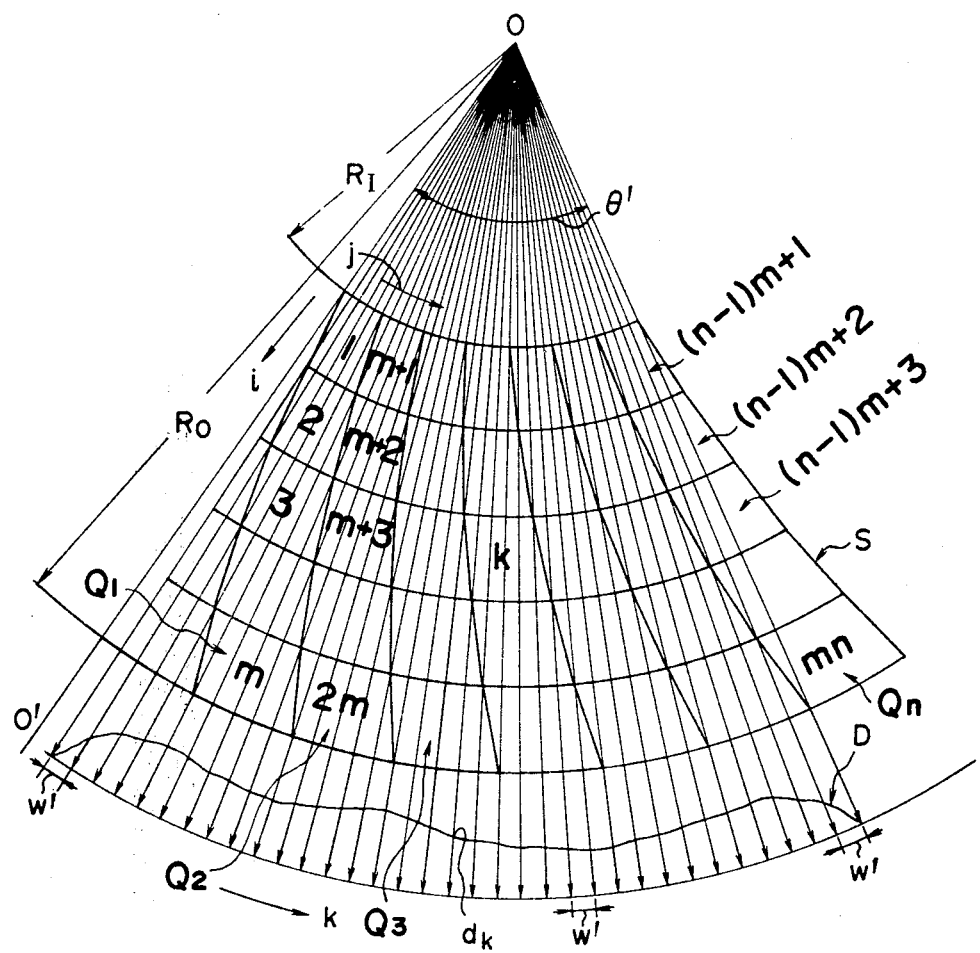
FIG. 7 is a schematic view for illustrating a reconstruction method of X-ray computed tomographic image of a fourth preferred embodiment of the present invention.

FIG. 7 is a schematic view for illustrating a reconstruction method of X-ray computed tomographic image of a fourth preferred embodiment of the present invention wherein the similar numbers in FIG. 7 substantially correspond to those of FIGS. 4 to 6.

In case of the fourth preferred embodiment of the present invention in which X-ray source A and X-ray tested tissue B are closely positioned relative to each other in the same manner as that of the above described second preferred embodiment, that is, the X-ray beam is a fan beam, the equation (12) may be produced and the above described theory may be applied as it is when the tomographic two dimensional data are constituted by the picture elements of modified polar coordinates as shown in FIG. 7.

In FIG. 7, the X-ray source is set at the origin O, an inner radius of polar coordinate piture elements is $R_I$, an outer radius thereof is $R_O$ and the picture elements are arranged m ×n. The picture elements have such numbers as shown in FIG. 7 and a straight line passing through the points OO' is set as a reference line for an angle.

The radii of $R_1$, $R_2$ and the angles $\varphi_1$, $\varphi_2$, $\varphi_3$, and $\varphi_4$ are defined as follows.

$$\left.\begin{aligned}
R_1 &= R_I + (i-1)\frac{R_o - R_I}{m} \\
R_2 &= R_I + i\frac{R_o - R_I}{m} \\
\varphi_1 &= (i-1)\frac{\theta'}{mn} + (j-1)\frac{\theta'}{n} \\
\varphi_2 &= (i-1)\frac{\theta'}{mn} + j\frac{\theta'}{n} \\
\varphi_3 &= \varphi_1 + \frac{\theta'}{mn} \\
\varphi_4 &= \varphi_2 + \frac{\theta'}{mn} \\
(i &= 1, 2, \ldots, m, j = 1, 2, \ldots n)
\end{aligned}\right\} \quad (19)$$

A straight line passing through the points ($R_1$, $\varphi_1$) and ($R_2$, $\varphi_3$) is $L_1$, another straight line passing through the points ($R_1$, $\varphi_2$) and ($R_2$, $\varphi_4$) is $L_2$, resulting in that the picture elements k shows an area enclosed by the radii $R_1$ and $R_2$ and two straight lines $L_1$ and $L_2$.

Provided that $\theta'$ is a zenith angle of the inside (radius of $R_I$) of the polar coordinate picture elements.

In this way, even in the case that the X-ray beam is a fan beam, it is possible to calculate the two dimensional data for each of the partial planes of columns of the tomographic plane from one dimensional data of m picture elements in the same manner of the parallel beam in the above described third preferred embodiment, thereby the tomographic image of the X-ray tested tissue B may be reconstructed from the single projectional distribution D of X-ray.

As in the above described third and fourth preferred embodiments, it is also possible to constitute a partial plane of columns of the tomographic plane by properly combining a group of picture elements of 2 m to m(n−1) in place constituting the partial plane of columns of the tomographic plane of the X-ray tested tissue B by each of the groups of m elements.

This group of picture elements may be constituted by the number of m to m (n−1) picture elements in order to form a partial plane of columns of the X-ray tested tissue B by each of said groups of picture elements, and in addition to this, the group of picture elements may be constituted by the number of n to (m−1)n of picture elements in order to make a partial plane of rows of the tomographic plane of the X-ray tested tissue B.

Each of the groups of picture elements may be constituted by the picture elements the number of which are less than m and n.

That is, one group of picture elements may be constituted by any number of picture elements if they are less than the number of mn but it is preferable that the number of picture elements constituting one group of picture elements is defined or set to the most suitable number in reference to a capacity of the data processing device and a data processing time.

Figure 8:
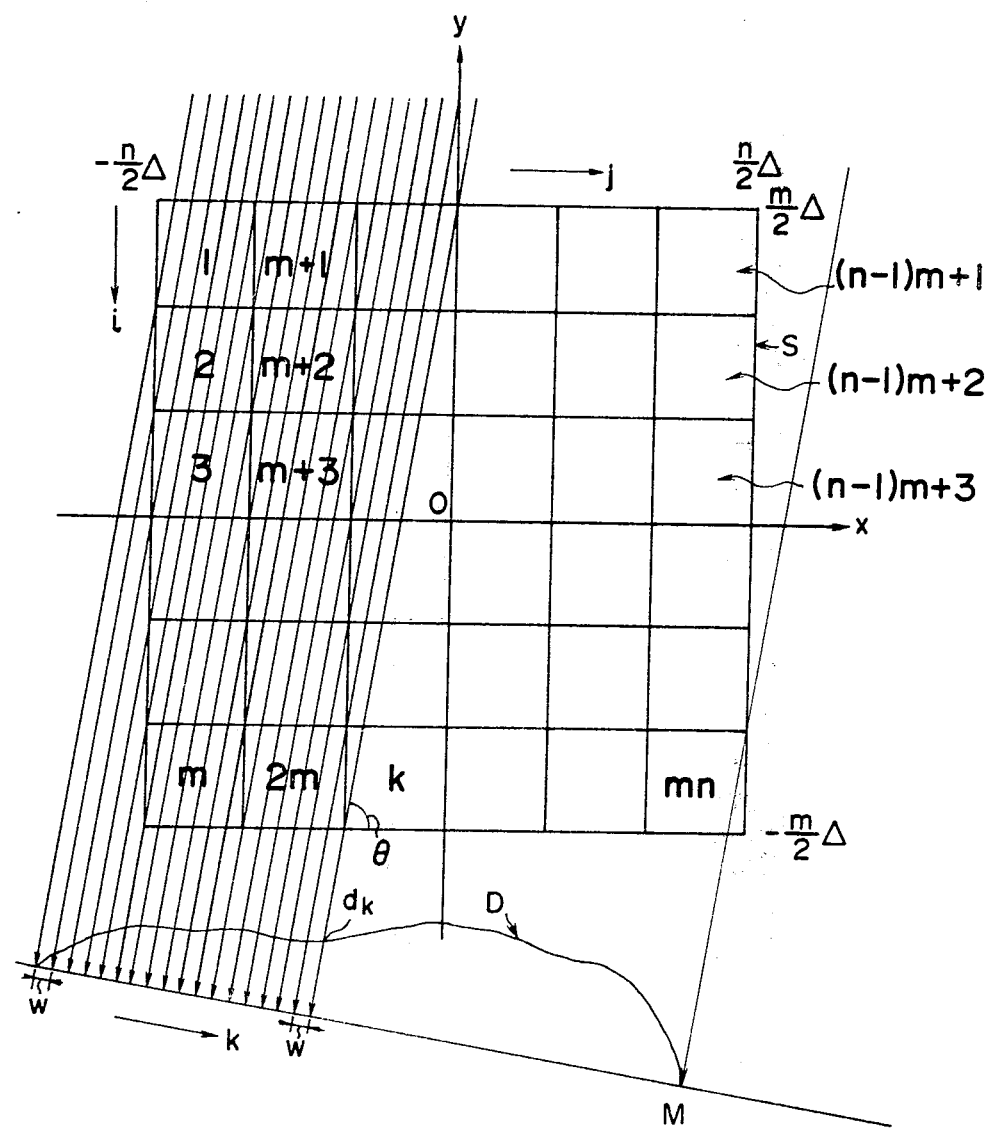
FIG. 8 is a schematic view for illustrating a reconstruction method of X-ray computed tomographic image of a fifth preferred embodiment of the present invention.

FIG. 8 is a schematic view for illustrating a reconstruction method of X-ray computed tomographic image of a fifth preferred embodiment of the present invention wherein the similar numbers in FIG. 8 substantially correspond to that of FIGS. 4 to 7.

In the fifth preferred embodiment of the present invention, a value of $d_k$ of a plurality of M ($=mn+m-1$) on a single projectional distribution D of X-ray produced by projecting X-ray from a desired direction to the X-ray tested tissue B is measured by the apparatus for measuring density of X-ray constituted by measuring apparatus for projectional distribution of X-ray E and A/D converter E′ etc. then the data output $d_k$ (digital signal) from the apparatus for measuring density of X-ray is fed to the dimensional transformer of projectional data F constituting the apparatus for calculating X-ray absorption coefficient.

This dimensional transformer of projectional data F may calculate and feed the signal corresponding to each of the X-ray absorption coefficients $\mu_1$ (two dimensional data) of the number of mn ($=N<M$) of the picture elements constituting a pseudo-tomographic plane S containing a tomographic image of the X-ray tested tissue of body B in reference to a digital data output $d_k$ (one dimensional data) from apparatus for measuring density of X-ray. As its practical example, a digital computer storing some desired programs therein may also be applied in the same manner as each of first to fourth preferred embodiments.

It will be described as follows as to such a method in which each of the X-ray absorption coefficients $\mu_1$ (two dimensional data) of the N picture elements constituting a pseudo-tomographic plane S containing a tomographic image of the X-ray tested tissue B is calculated in reference to each of the M values $d_k$ (one dimensional data) on a single projectional distribution D of X-ray.

At first, it is assumed that the pseudo-tomographic plane S applied as a tomography reconstruction plane of the X-ray tested tissue B is constituted by the mn ($=N$) picture elements divided into some small sections as shown in FIG. 8 and a center of the plane S is set at an original point of X-Y coordinates.

Also, it is assumed that one picture element has the same X-ray absorption coefficent, and for the sake of convenience of description, m and n are even numbers and a size of one picture element is a square of $\Delta \times \Delta$.

Further, it is assumed that X-ray beam passing through the pseudo-tomographic plane S is projected in parallel from a direction $\theta$ fulfilling a relation of $\theta = \tan^{-1}m$ and a beam diameter of each of the unit X-ray beams is sufficiently small compared to that of each of the picture elements.

The following equation may be provided when each of the picture elements has a number in accordance with the order as shown in FIG. 8, the absorption coefficient is expressed by $\mu_1$ and the projectional density produced by the unit X-ray beam projected from a direction of $\theta$ and passing through the point $(x_j, Y_i)$ in x−y coordinates is expressed by $d_k$.

$$x_j = \left( -\frac{n}{2} + j - 1 \right) \cdot \Delta,$$

$$y_i = \left( \frac{m}{2} - i \right) \cdot \Delta,$$

$$t = (j-1) \cdot m + i$$
$$(i = 1, 2, \ldots, m; j = 1, 2, \ldots, n)$$
$$k = (j-1) \cdot m + i,$$

Provided that,
$$k \neq mn + m$$

($i = 1, 2, \ldots, m$; $j = 1, 2, \ldots, n+1$)
where i is a row and j is a column.

$$\mathbb{L}\mu = \mathbb{D} \tag{20}$$

Provided that, $$\mathbb{L} = \alpha \left( m \left\{ \begin{bmatrix} 1 & 0 & 0 & 0 & \cdots & & & 0 & 0 \\ 1 & 1 & 0 & & & & & & 0 \\ 1 & 1 & 1 & 0 & & & & & 0 \\ \vdots & & & & & & & & \vdots \\ & 1 & & & & & & & \\ & 0 & 1 & & & & & & \\ \vdots & & & & & & 0 & 1 & \\ & & & & & & 1 & 0 & \\ \vdots & & & & & & & 1 & \\ & & & & & & & & \vdots \\ 0 & & & & & & & & 1 \\ 0 & & & & & & & 0 & 1 \\ 0 & & & & & & 0 & 1 & 1 \\ 0 & 0 & 0 & \cdots & & & 0 & 0 & 1 \end{bmatrix} \right\} m \right) \tag{21}$$

$$\mu = (\mu_1, \mu_2, \mu_3, \ldots, \mu_{mn})^T$$

$$\mathbb{D} = (d_1, d_2, d_3, \ldots, d_{mn+m-1})^T$$

$\mathbb{L}$ is a band matrix of $(mn+m-1) \times mn$.

$\alpha$ is a length of X-ray beam passing through the picture elements and fulfills a relation of $\alpha = \Delta\sqrt{1+\cot^2\theta}$ and a symbol $^t$ indicates a transposition.

In the equation (20), since the number M of the equality is higher than the number N of the X-ray absorption coefficient $\mu_1$ as an unknown value, the optimum value of the X-ray absorption coefficient $\mu_1$ as the unknown value is calculated.

Accomplishing the calculation will require a method of least squares.

Therefore, when the method of least squares is applied to the equation (20), the following relation may be provided by multiplying transposed matrix $\underline{\underline{l}}^T$ to both left sides of the equation (20):

$$\underline{\underline{l}}^T \underline{\underline{l}} \mu = \underline{\underline{l}}^T \underline{\underline{D}} \quad \ldots (22)$$

Since thus obtained equation (22) shows the same number of unknown values as that of the equality, it is possible to calculate the tomographic two dimensional data $\mu_t$ of the X-ray tested tissue B in reference to the equation (22).

However, in the actual X-ray tested tissue B, it is difficult to keep the value $\mu_t$ constant and in general the value $\mu_t$ has some measuring errors. So it is hardly expected that the two dimensional data $\mu_t$ calculated by the equation (22) show a better result, even when the assumption that the value $\mu_t$ is kept constant is slightly relaxed or a slight measuring error is found in the assumption.

Thus, when an answer for making an object function of $$F = \sum_{k=1}^{M} r_k \quad (23)$$

minimum is calculated by a mathermatical programming under an equation of restrictive condition substantially the same as that of said equations (4) and (5) by introducing the non-negative correction values $r_1, r_2, r_3 \ldots r_M$ or non-negative slack variables $s_1, s_2, s_3 \ldots s_{3M}$, the result is that the most suitable two dimensional data $\mu_t$ may be calculated without any variation after a limited number of times of calculation.

Provided that the suffix i of $l_{i,j}$, $\mu_j$, $r_i$, $P_i$ in equations (4) and (5) is 1, 2, 3, ... M, and the suffix j is 1, 2, 3, ... N, and the slack variable is as described above $s_1, s_2, s_3 \ldots s_{3M}$.

In the above example, the two dimensional data $\mu_t$ has been calculated in reference to the object function for making a sum of absolute values of correction values in the equation of restrictive conditions minimum, there is also another method in which the object function of the a above described equation (8) is made to be minimum on the basis of the equation of restrictive condition being substantially the same as that of said equation (7).

Also provided in this case that the suffix i of $l_{i,j}$, $\mu_j$, $p_i$ is 1, 2, 3 ..., M and the suffix j is 1, 2, 3, ..., N.

In reference to this, two dimensional tomographic data $\mu_t$ are calculated under such conditions as the maximum correction value of the absolute value in substantially the same quation as equations (4) and (5) equation of restrictive conditions is minimum.

Further, it is possible to perform a calculation either by a method for making an object function of $$F = \sum_{k=1}^{M} r_k^2 \quad (24)$$

minimum under an equation of restrictive condition of the preferred embodiment corresponding to equation (5) or by a method for making an object function of $$F = r^2 \ldots \quad (25)$$

minimum under an equation of restrictive condition of the preferred embodiment corresponding to equation (7). As described above, M shows $mn+m-1$, and N is mn.

The two dimensional data $\mu_t$ obtained in this way is transmitted to the memory for three dimensional structure G.

As in the same manner as described in each of the first to fourth preferred embodiments, the devices I, F' and J are connected in sequence to the memory G.

In order to reconstruct a tomography of the X-ray tested tissue B under the above described arrangement, each of the values $d_k$ at the positions k of the number M equally spaced apart from each other by a distance w from one end of the projectional distribution of D X-ray is measured by using the measuring apparatus E for projectional distribution of X-ray up to the other end of said projectional distribution D of X-ray, for the simple projectional distribution D of X-ray produced by the X-ray detector C by projecting X-ray from X-ray source A in a desired direction to the X-ray tested tissue B, resulting in forming one dimensional data $d_k$.

Then, these one dimensional data $d_k$ are converted properly from their analogue form to digital form, and each of the X-ray absorption coefficients $\mu_t$ (two dimensional data) of the N(<M) picture elements in the pseudo-tomographic plane S is calculated by applying the method explained in the present specification from page 50, line 1 to page 54, line 18 by the dimensional transformer of projectional data F.

Thereafter, the two dimensional data $\mu_t$ is reconstructed and displayed as a tomography of the X-ray tested tissue B by the display J of computed tomography of arbitrary transverse section via memory G, the computed tomography reconstruction apparatus H of arbitrary transverse section, the improving apparatus for image quality of arbitrary transverse section and D/A converter F'.

Figure 9:
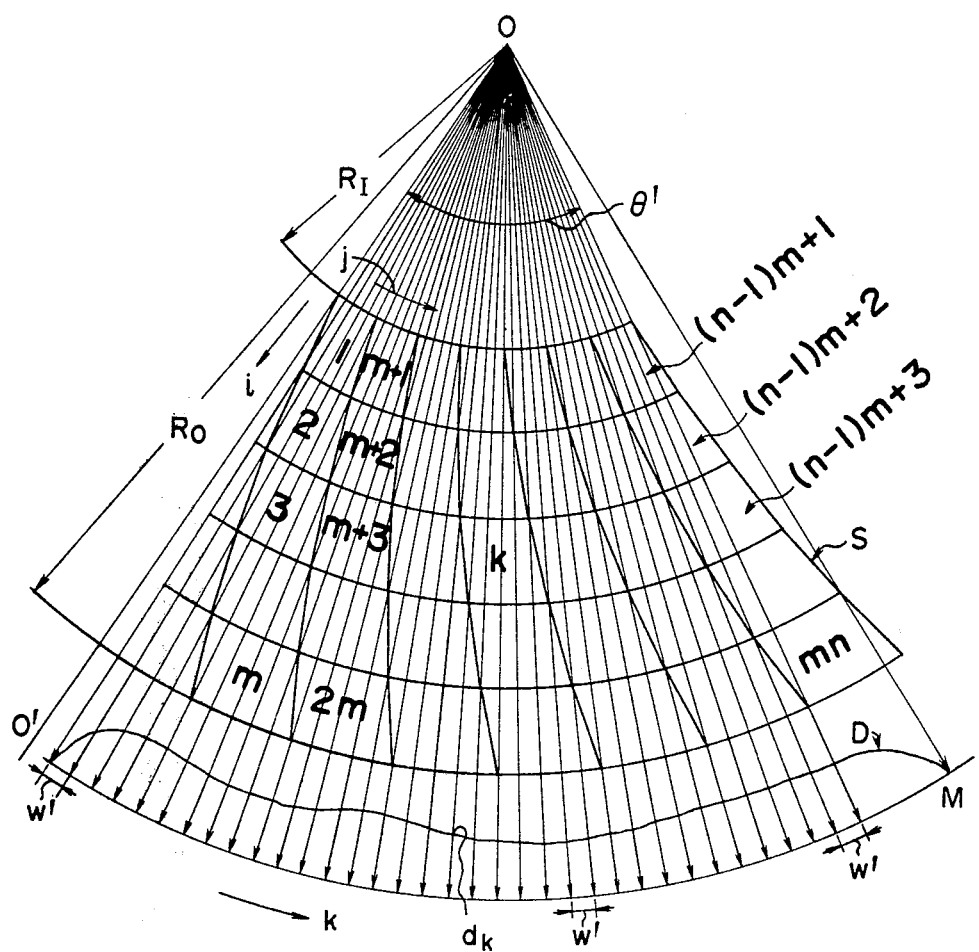
FIG. 9 is a schematic view for illustrating a method of X-ray computed tomographic image of a sixth preferred embodiment of the present invention.

FIG. 9 is a schematic view for ilustrating a reconstruction method of X-ray computed tomographic image of a sixth preferred embodiment of the present invention, wherein the similar numbers in FIG. 9 substantially correspond to that of FIGS. 4 to 8.

In the sixth preferred embodiment of the present invention, as in the same manner as that of the second and fourth preferred embodiments in which X-ray source A and the X-ray tested tissue B are closely positioned, that is, the X-ray beam is a fan beam, and in this case, when the two dimensional tomographic data $\mu_t$ are constituted by the picture elements of modified polar coordinates as shown in FIG. 9, the equation (20) may be provided and the above described theory may be applied as it is.

In FIG. 9, X-ray source is set at an origin O, the inner radius of polar coordinate picture elements is $R_I$, the outer radius thereof is $R_O$, and the picture element is constituted by $m \times n$. The picture elements have the numbers shown in FIG. 9 and a straight line passing through the points OO' is used as a reference line for an angle.

The radii $R_1$ and $R_2$ and the angles $\varphi_1, \varphi_2, \varphi_3,$ and $\varphi_4$ are expressed as follows.

$$\left.\begin{array}{l} R_1 = R_I + (i-1)\dfrac{R_o - R_I}{m} \\[6pt] R_2 = R_I + i\dfrac{R_o - R_I}{m} \\[6pt] \varphi_1 = (i-1)\dfrac{\theta'}{mn} + (j-1)\dfrac{\theta'}{n} \\[6pt] \varphi_2 = (i-1)\dfrac{\theta'}{mn} + j\dfrac{\theta'}{n} \\[6pt] \varphi_3 = \varphi_1 + \dfrac{\theta'}{mn} \\[6pt] \varphi_4 = \varphi_2 + \dfrac{\theta'}{mn} \\[6pt] (i=1,2,\ldots,m, j=1,2,\ldots,n) \end{array}\right\} \quad (26)$$

When a straight line passing through the points ($R_1$, $\varphi_1$) and ($R_2$, $\varphi_3$) is $L_1$, and another straight line passing through the points ($R_1$, $\varphi_2$) and ($R_2$, $\varphi_4$) is $L_2$, the picture element t is an area enclosed by the radii $R_1$ and $R_2$ and two straight lines $L_1$ and $L_2$.

Provided that $t = i + (J-1) \cdot m$ and $\theta'$ is a zenith angle of the inside (radius of $R_I$) of the polar coordinate picture elements.

Thus, even in a case that the X-ray beam is a fan beam, it is possible to calculate the two dimensional data $\mu_t$ from one dimensional data $d_k$ in the same manner as that of the parallel beams in the above described fifth preferred embodiment and thereby it is possible to reconstruct the tomographic image of the X-ray tested tissue B in reference to a simple projectional distribution of X-ray.

$$k=(j-1)m+i, \quad k \neq m(n+1)$$
$$(i=1,2,\ldots,m; j=1,2,\ldots,n+1)$$

Figure 10:
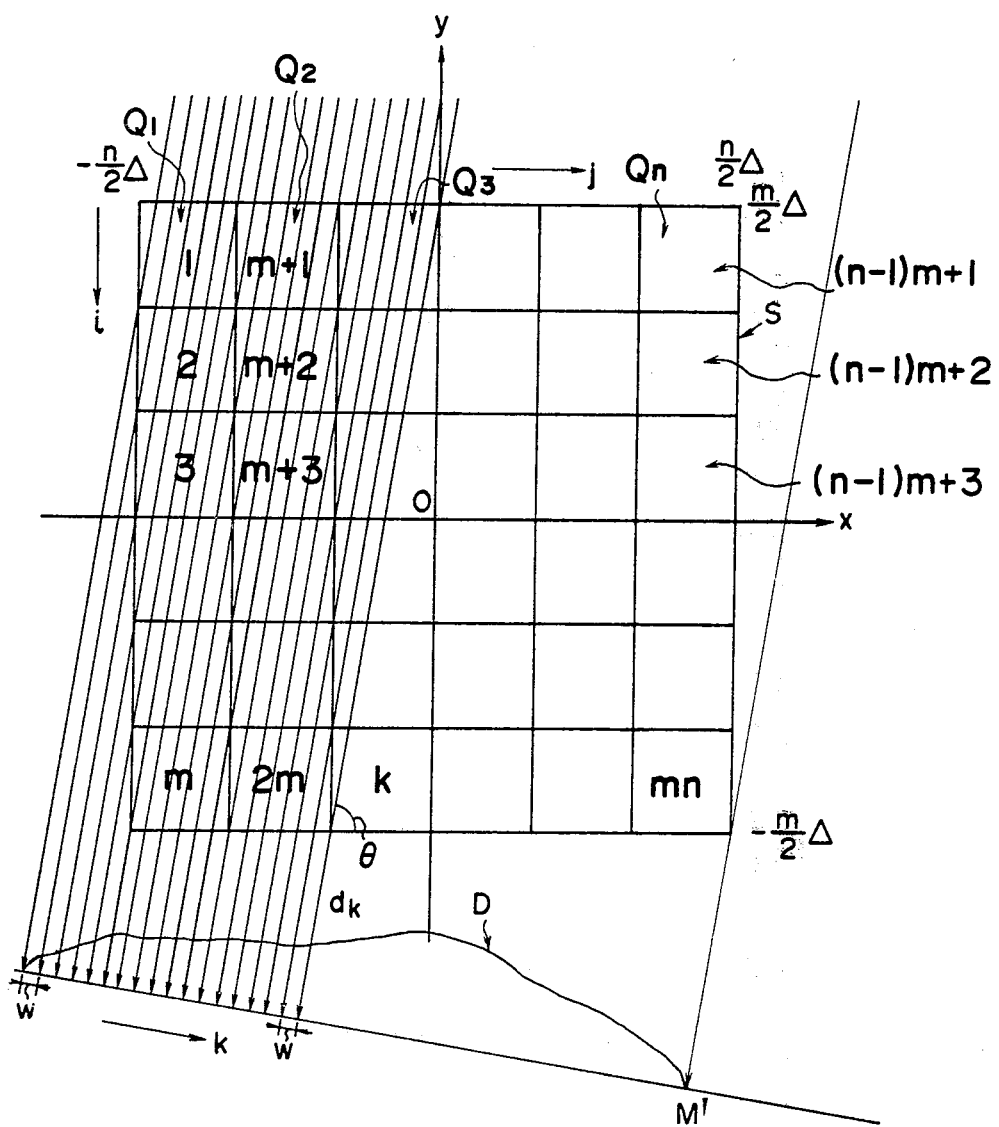
FIG. 10 is a schematic view for illustrating a method of X-ray computed tomographic image of a seventh preferred embodiment of the present invention.

FIG. 10 is a schematic view for illustrating a reconstruction method of X-ray computed tomographic image of a seventh preferred embodiment of the present invention, wherein the similar numbers in FIG. 10 substantially correspond to that of FIGS. 4 to 9.

In the seventh preferred embodiment of the present invention, it is possible to get a set of n [total M' (=mn+m)] of a group of measured values constituted by the measurement values provided at each of 2 m positions properly spaced apart in sequence with each other from one end of the single projectional distribution D of X-ray to the other end thereof which has been made by projecting X-ray from a desired direction to the X-ray tested tissue B with the apparatus for measuring density of X-ray constituted by measuring apparatus E for projectional distribution of X-ray and A/D converter E' etc., and the data outputs (digital signals) for each of n groups of measured values from the apparatus for measuring density of X-ray are fed in sequence to the dimensional transformer F of projectional data constituting the apparatus for calculating X-ray absorption coefficient.

The dimensional transformer F of projectional data may use 2 m signals corresponding to each of the X-ray absorption coefficients $\mu_1$ (two dimensional data) of each of the picture elements in n group of picture elements constituted by u (=m) of picture elements less than 2 m measured values in n group of measured values, calculate them in sequence and feed out the result. As its practical embodiment, a digital computer storing the desired programs in it may be used in the same manner as that of each of the first to sixth preferred embodiments.

Such a method will be described as each of the X-ray absorption coefficients $\mu_t$ (two dimensional data) of mn picture elements as constituting components for the pseudo-tomographic plane S (the plane S being constituted by n group of picture elements) containing a tomographic image of the X-ray tested tissue B is provided in reference to a group of each of the measured values constituted by each 2 m values $d_k$ (one dimensional data) on a single projectional distribution D of X-ray.

At first, it is assumed that the pseudo-tomographic plane S used as a tomography reconstruction plane of the X-ray tested tissue B is assembled by n groups of picture elements applies as a partial plane of columns in said reconstruction plane of tomography constituted by the m small divided picture elements, as illustrated in FIG. 10, and further a center of the plane S is set at an origin of x - y coordinates.

Further, it is assumed that one picture element has the same X-ray absorption coefficients and for the sake of convenience of description, m and n are even number and a size of one picture element is a square of $\Delta \times \Delta$.

Then, it is also assumed that the X-ray beam passing through the pseudo-tomographic plane S is radiated in parallel from a direction of $\theta$ fulfilling a relation of $\theta = \tan^{-1} m$, and a beam diameter of each of the unit X-ray beams is sufficiently small compared with that of each of the picture elements.

At first, the X-ray absorption coefficients $\mu_1$ to $\mu_m$ of each of the picture elements 1 to m in the first group $Q_1$ of the picture elements are to be calculated and in the preferred embodiment of the present invention, the $v_1$ (=2m) projectional densities $d_1$ to $d_{2m}$ more than m are to be applied. In the actual calculation, the following equation may be provided;

$$L = D_{Q1} \qquad (27)$$

Provided that, $$L = \alpha \underbrace{\begin{bmatrix} 1 & & & & & & \\ 1 & 1 & & & & & \\ 1 & 1 & 1 & & 0 & & \\ \cdot & & & & & & \\ \cdot & & & & & & \\ 1 & & & 1 & & & \\ & 1 & & & 1 & & \\ & & 1 & & & 1 & \\ & & & & & & \\ 0 & & & & & & \\ & & & 1 & 1 & & 1 \\ & & & & 1 & 1 & 1 & 1 \end{bmatrix}}_{m} \Big\}m \qquad (28)$$

$$u = (\mu_1, \mu_2, \mu_3, \ldots, \mu_{2m})^\tau$$

$$D_{Q1} = (d_1, d_2, d_3, \ldots, d_{2m})^\tau$$

L is a square matrix of 2m=2m.

And $\alpha$ is a length of X-ray beam passing through the picture elements and fufills a relation of $$\alpha = \Delta \sqrt{1 + \cot^2 \theta}$$

a symbol $\tau$ indicates a transposition.

However, in the actual X-ray tested tissue of body B, the tissue shows a measuring error in general, so that it is hardly expected to have a better result from the two dimensional data $\mu_1$ to $\mu_{2m}$ calculated in reference to the equation (27).

Thus, a solution for making an object function of $$F = \sum_{k=1}^{2m} r_k \qquad (29)$$

minimum under the equations of restrictive conditions which are substantially the same as that of equations (4) and (5) after introduction of the non-negative correction values $r_1, r_2, r_3, \ldots, r_{2m}$ or non-negative slack variables $s_1, s_2, s_3, \ldots, s_{3(2m)}$ is calculated by a mathematical programming, resulting in that the two dimensional optimum value $\mu_1$ to $\mu_{2m}$ may be calculated without any variation after the limited number of times of calculation.

Provided that the suffixes of i and j of $l_{i,j}, \mu_j, r_i$ and $p_i$ in equations (4) and (5) are $1, 2, 3, \ldots, 2m$ respectively and the slack variables are as described above $s_1, s_2, s_3, \ldots, s_{3(2m)}$.

In the above described example, the two dimensional data $\mu_1$ to $\mu_{2m}$ are calculated in reference to an object function for making a sum of the absolute values of the correction values minimum under the equations of restrictive conditions. However, there is also provided such a method as the object function of equation (8) is made to be minimum under an equation of restrictive conditions being substantially the same as that of equation (7).

Provided that also in this case the suffixes i and j of $l_{i,j}, \mu_j,$ and $p_i$ of $l_{i,j}, \mu_j, p_i$ in equation (7) are $1, 2, 3, \ldots 2m$.

In reference to the above described condition, the two dimensional tomographic data $\mu_1$ to $\mu_{2m}$ are calculated under such a condition as the maximum correction values of the absolute values in the equation of restrictive conditions being substantially the same as equation (7) are made to be minimum.

Further, it is also possible to perform a calculation either by a method in which an object function of $$F = \sum_{k=1}^{2m} r_k^2 \qquad (30)$$

is made to be minimum under an equation of restrictive condition of the preferred embodiment corresponding to equation (5) or by another method in which an object function of $$F 32 \; r^2 \ldots \qquad (31)$$

is made to be minimum under an equation of restrictive condition of the preferred embodiment corresponding to equation (7).

Only the first number of m of the two dimensional data $\mu_1$ to $\mu_{2m}$, that is $\mu_1$ to $\mu_m$ thus obtained are transmitted to the memory for three dimensional structure G.

Then, in order to calculate the X-ray absorption coefficients $\mu_{m+1}$ to $\mu_{2m}$ of each of the picture elements $(m+1)$ to $2m$ in the second group $Q_2$ of the picture elements, $V_2 (=V_1=2m)$ projectional densities $d_{m+1}$ to $d_{3m}$ and the just calculated X-ray absorption coefficient are applied. The optimum X-ray absorption coefficients (two dimensional tomographic data) $\mu_{m+1}$ to $\mu_{3m}$ are calculated by the mathematical programming in the same manner as the X-ray absorption coefficient of each of the picture elements in the first group $Q_1$ of the picture elements described above is calculated and thereafter only the first number of m of these two dimensional data $\mu_{m+1}$ to $\mu_{3m}$, that is $\mu_{m+1}$ to $\mu_{2m}$ are transmitted to the memory G.

Similar calculations are repeated in sequence and the X-ray absorption coefficient of each of the picture elements in subsequent groups $Q_3$ to $Q_n$ of the third to n-th of the picture elements is calculated, and only the first number of m each of the two dimensional data are transmitted in sequence to the memory G.

The memory for three dimensional structure G used is made such that as described above a set of m signals from the dimensional transformer F of projectional data is received, each of the groups $Q_1$ to $Q_n$ of the picture elements is assembled with each other in accordance with their relative orders, that is, in order to assemble the first to n-th groups of picture elements from their left side in accordance with their orders, the signals from the dimensional transformer F of projectional data may be stored therein and further such that the three dimensional structure data of the X-ray tested tissue B are calculated. n sets of two dimensional data $\mu_t$ ($t=1,2,3,\ldots,mn$), where each of set comprises m data, transmitted in sequence from the dimensional transformer of projectional data F show that of a certain tomographic plane of the X-ray tested tissue B, and it is possible to calculate another projectional distribution D' of X-ray by changing a measuring point with the measuring apparatus E for projectional distribution of X-ray and also to facilitate a calculation of the two dimensional data $\mu_1'$ concerning other tomographic planes in the same manner as that described above, so that three dimensional structure of the X-ray tested tissue B may be stored by accumulating the two dimensional data $\mu_t, \mu_t', \mu_t'' \ldots$ concerning some different tomographic planes. However, in order to make a complete three dimensional structure, it will become necessary to have an interpolation etc. between each of the tomographic data and in view of this fact, the present memory G is used as a memory device having a calculation function for performing the interpolation etc.

It is the same as that of each of the preferred embodiments that to this memory G is connected the display of J computed tomography of arbitrary transverse section via the computed tomography reconstruction apparatus H of arbitrary transverse section, the improving apparatus I for image quality of arbitrary transverse section and D/A converter F'.

In order to reconstruct a tomography of the X-ray tested tissue B in reference to the above described aarrangement, each of the values $d_k$ at M' ($=mn+m$) positions equally spaced apart with each other by a distance w from one end of said projectional distribution D of X-ray is measured up to the other end of said projectional distribution D of X-ray with the measuring apparatus E for projectional distribution of X-ray for a single projectional distribution D of X-ray produced by the X-ray detector C by projecting X-ray from X-ray source A in a desired direction toward the X-ray tested tissue B and thereby one dimensional data $d_k$ may be calculated.

Then, these one dimensional data $d_k$ are properly converted from their analogue form to digital form, and the X-ray absorption coefficient of each of the picture elements for a set of the 2 m pieces picture elements is calculated by the dimensional transformer F of projectional data with the above described method. Each of the first m X-ray absorption coefficients is transmitted to the memory G and each of the X-ray absorption coefficients $\mu_1$ to $\mu_{mn}$ (two dimensional data) of mn picture elements in the pseudo-tomographic plane S is calculated, thereby these X-ray absorption coefficients are stored in the memory G in accordance with the predetermined order.

Then, these two dimensional data $\mu_1$ to $\mu_{mn}$ are reconstructed and displayed as a tomographic image of the X-ray tested tissue B by the display J of computed tomography of arbitrary transverse section via memory G, the computed tomography reconstruction apparatus H of arbitrary transverse section, the improving apparatus I for image quality of arbitrary transverse section and D/A converter F'.

Figure 11:
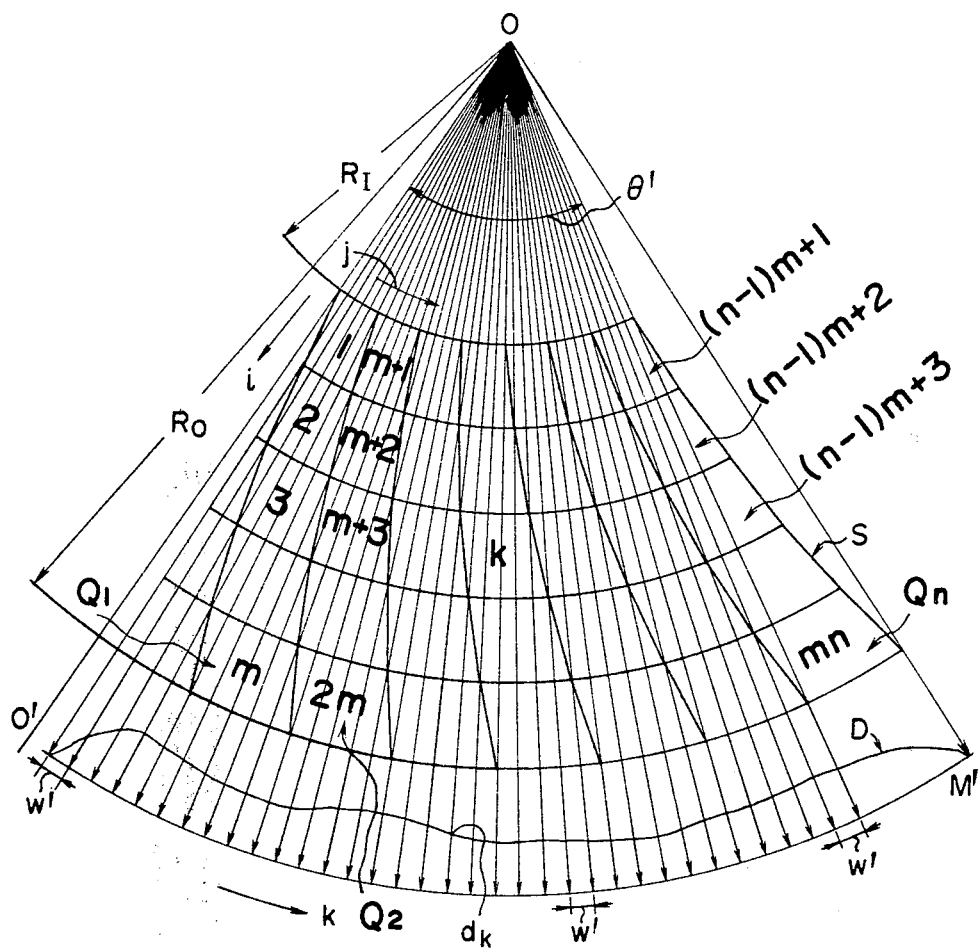
FIG. 11 is a schematic view for illustrating a method of X-ray computed tomographic image of an eighth preferred embodiment of the present invention.

FIG. 11 is a schematic view for illustrating a reconstruction method of X-ray computed tomographic image of an eighth preferred embodiment of the present invention, wherein similar numbers in FIG. 11 substantially correspond to those of FIGS. 4 to 10.

The eighth preferred embodiment is the same as that of the above described second, fourth and sixth preferred embodiments in which the X-ray source A and the X-ray tested tissue B are closely positioned relative to each other, that is, the X-ray beam is a fan beam. In this case, when the two dimensional tomographic data are constituted by the picture elements of modified polar coordinate as shown in FIG. 11, the equation (27) may be produced and the above described theory may be applied as it is.

In FIG. 11, the X-ray source is set at an origin O, the inner radius of the polar coordinate picture elements is $R_I$, the outer radius thereof is $R_o$, and the picture elements are $m \times n$. The picture elements have the numbers as illustrated in FIG. 5 and a straight line passing through OO' is applied as a reference line for an angle. The radii $R_1$ and $R_2$ and the angles $\varphi_1$, $\varphi_2$, $\varphi_3$, and $\varphi_4$ are expressed as follows.

$$\left.\begin{array}{l} R_1 = R_I + (i - 1) \dfrac{R_o - R_I}{m} \\[4pt] R_2 = R_I + i \dfrac{R_o - R_I}{m} \\[4pt] \varphi_1 = (i - 1) \dfrac{\theta'}{mn} + (j - 1) \dfrac{\theta'}{n} \\[4pt] \varphi_2 = (i - 1) \dfrac{\theta'}{mn} + j \dfrac{\theta'}{n} \\[4pt] \varphi_3 = \varphi_1 + \dfrac{\theta'}{mn} \\[4pt] \varphi_4 = \varphi_2 + \dfrac{\theta'}{mn} \\[4pt] (i = 1, 2, \ldots, m, j = 1, 2, \ldots, n) \end{array}\right\} \quad (32)$$

It is assumed that a straight line passing through the points $(R_1, \varphi_1)$ and $(R_2, \varphi_3)$ is $L_1$, and a straight line passing through the points $(R_1, \varphi_2)$ and $(R_2, \varphi_4)$ is $L_2$, and the picture element t is an area enclosed by the radii $R_1$ and $R_2$ and the two straight lines $L_1$ and $L_2$.

Provided that $\theta'$ is a zenith angle of the inside (radius of $R_I$) of the polar coordinate picture element.

In this way, even in a case that the X-ray beam is a fan beam, it is possible to calculate the two dimensional data for each of the partial planes of columns of tomographic plane in reference to the number of 2m of one dimensional data in the same manner as that of the parallel beams as in the above described seventh preferred embodiment, and thereby it is also possible to reconstruct a tomographic image of the X-ray tested tissue B in reference to the single projectional distribution D of X-ray.

As in the above described seventh and eighth preferred emodiments, it is also possible to construct the partial plane of columns of the tomographic plane of the X-ray tested tissue B by properly combining the groups of picture elements constituted by 2m to m(n−1) picture elements instead of the partial plane of columns of tomographic plane of the X-ray tested tissue of B being formed by each of the groups of the m picture elements.

It is also possible to constitute the groups of picture elements by n to (m−1).n in picture elements order to form a partial plane of rows of said tomographic plane in addition to that the groups of picture elements are constituted by m to m.(n−1) picture elements so as to cause each of said groups of picture elements to form a plane of rows of tomography of the X-ray tested tissue.

Further, it is also possible to constitute each of the groups of picture elements by such number of picture elements as is less than m, n.

That is, one group of picture elements may be constituted by any number of picture elements if it has such a number as is less than the number mn. However, the number of picture elements forming a group of picture elements may preferably be defined as the optimum number in reference to a capacity of a data processing device and a data processing time.

A suitable number of measurement values may be applied if they are more than the number of m instead of the 2m measurement values being applied as one dimensional data.

What is claimed is:

1. A reconstruction method of a computed tomographic image from a single X-ray projection comprising:
    (a) measuring each of the values $d_k$ (k is a natural number) of X-ray density on a single X-ray projectional distribution produced by projecting X-rays from a desired direction toward X-ray tested tissue of a body at a plurality of positions spaced apart from each other from one end of said projectional distribution toward the other end thereof, where said plurality of positions spaced apart from each other for measurement of the values $d_k$ of X-ray density are selected according to the following two criteria (i) that the tomographic plane of the X-ray tested tissue of a body to be reconstructed is expressed by a pseudo-tomographic plane which is constituted collectively by mn pieces of picture elements, with m pieces of picture elements in a row and n in a column (both m and n are natural numbers), which are formed by dividing said tomographic plane of the X-ray tested tissue of a body into small sections and each of which has a single piece of X-ray density information, and that said pseudo-tomographic plane is placed between an X-ray source and said single X-ray projectional distribution, (ii) that n rows, each of which is constituted by m pieces of picture elements are numbered in order 1,2,...,n from the left and that said m pieces of picture elements in each row are numbered respectively 1,2,...,m; m+1,m+2,...,2m; ...; (n−1)m+1, (n−1)m+2,...,mn from the side of said X-ray source toward the side of said single X-ray projectional distribution in order and that a plurality of X-ray beams passing through said pseudo-tomographic plane include X-ray beams numbering mn, each of which passes through a left lower corner of a corresponding picture element of said mn picture elements, said plurality of positions spaced apart from each other on the single X-ray projectional distribution for measurement of the values $d_k$ of X-ray density correspond to the positions on said single X-ray projectional distribution which have X-ray density information to be obtained by said X-ray beams' passing through said pseudo-tomographic plane based on criteria (i) and (ii);

(b) calculating the X-ray absorption coefficient $\mu_t$ (t = 1,2,3, . . . ,mn, and t is natural number) of each of the mn pieces of picture elements based on the values $d_k$ of X-ray density measured in step (a) and the length of the X-ray beams passing through each picture element;

(c) reconstructing the computed tomographic image of said X-ray tested tissue of a body, where the picture elements having respectively X-ray absorption coefficients $\mu_1, \mu_2, \ldots \mu_{mn}$ calculated in step (b) are positioned at the locations of said picture elements numbered 1,2, . . . , mn of the pseudo-tomographic plane and wherein the complete collection of picture elements located in the m×n array constitute the reconstructed computed tomographic plane of the X-ray tested tissue of a body.

2. A reconstruction method of a computed tomographic image from a single X-ray projection according to claim 1, wherein neighboring measuring positions on said X-ray projectional distribution are equally spaced apart.

3. A reconstruction method of a computed tomographic image from a single X-ray projection according to claim 1, wherein said pseudo-tomographic plane is constituted collectively by mn pieces of square picture elements with m pieces of picture elements in a row and n pieces of picture elements in a column, and each said X-ray beam crosses with the base of each picture element at an angle $\theta$, where $\theta = \tan^{-1} m$.

4. A reconstruction method of a computed tomographic image from a single X-ray projection comprising:

(a) measuring each of the values $d_k$ (k = 1,2,3, . . . , mn, and both of m and n are natural numbers) of X-ray density on a single X-ray projectional distribution produced by projecting X-rays from a desired direction toward X-ray tested tissue of a body at positions numbering mn spaced apart from each other from one end of said projectional distribution toward the other end thereof, where said positions numbering mn spaced apart from each other for measurement of the valued $d_k$ of X-ray density are selected according to the following two criteria: (i) that the tomographic plane of the X-ray tested tissue of a body to be reconstructed is expressed by a pseudo-tomographic plane which is constituted collectively by mn pieces of picture elements, with m pieces of picture elements in a row and n in a column (both m and n are natural numbers), which are formed by dividing said tomographic plane of the X-ray tested tissue of a body into small sections and each of which has a single piece of X-ray density information, and that said pseudo-tomographic plane is placed between an X-ray source and said single X-ray projectional distribution, (ii) that n rows, each of which is constituted by m pieces of picture elements are numbered in order 1,2, . . . , n from the left and that said m pieces of picture elements in each row are numbered respectively 1, 2, . . . , m; m+1, m+2, . . . , 2m; . . . ; (n−1)m+1, (n−1)m+2, . . . , mn from the side of said X-ray source toward the side of said single X-ray projectional distribution in order and that each of the X-ray beams numbering mn passing through said pseudo-tomographic plane passes through a left lower corner of a corresponding picture element of said mn picture elements, said positions numbering mn spaced apart from each other on the single X-ray projectional distribution for measurement of the valued $d_k$ of X-ray density correspond to the positions on said single X-ray projectional distribution which have X-ray density information to be obtained by said X-ray beams' passing through said pseudo-tomographic plane based on criteria (i) and (ii);

(b) calculating the X-ray absorption coefficient $\mu_t$ (t = 1,2, . . . , mn, and t is natural number) of each of the mn pieces of picture elements based on the values $d_k$ of X-ray density measured in step (a) and the length of the X-ray beams passing through each picture element in accordance with following equations:

$$L\mu = D$$

where, $$\mathbb{L} = \alpha \begin{pmatrix} \begin{bmatrix} 1 & 0 & 0 & 0 & & & & & \cdots & & 0 & 0 & 0 \\ 1 & 1 & 0 & & & & & & & & & & 0 \\ 1 & 1 & 1 & 0 & & & & & & & & & 0 \\ \vdots & & & \ddots & & & & & & & & & 0 \\ \vdots & & & & \ddots & & & & & & & & \vdots \\ 1 & & & & & & & & & & & & \vdots \\ 0 & 1 & & & & & \ddots & & & & & & \vdots \\ \vdots & \ddots & & & & & & & & & & & \vdots \\ \vdots & & & & & & & & \ddots & & & 0 & 0 \\ \vdots & & & & & & & & & 1 & & 1 & 0 \\ 0 & \cdots & & 0 & 1 & 1 & 1 & \cdots & & & & 1 & 1 \end{bmatrix} \end{pmatrix}$$

and where, $$\mu = (\mu_1, \mu_2, \mu_3, \ldots, \mu_{mn})^T$$

$$D = (d_1, d_2, d_3, \ldots d_{mn})^T$$

L is a square matrix of mn×mn, T indicates a matrix transpose and $\alpha$ is a length of X-ray beam passing through each picture element;

(c) reconstructing the computed tomographic image of said X-ray tested tissue of a body where the picture elements having respectively X-ray absorption coefficients $\mu_1, \mu_2, \ldots, \mu_{mn}$ calculated in step (b) are positioned at the locations of said picture elements numbered 1,2, . . . , mn of the pseudo-tomographic plane and wherein the complete collection of picture elements located in the m×n array constitute the reconstructed computed tomographic plane of the X-ray tested tissue of a body.

5. A reconstruction method of a computed tomographic image from a single X-ray projection comprising:

(a) measuring each of the values $d_k$ (k = 1,2, . . . , u, 7 < mn, and u, m and n are natural numbers) of X-ray density on a single X-ray projectional distribution produced by projecting X-rays from a desired direction toward X-ray tested tissue of a body at positions numbering u spaced apart from each other from one end of said X-ray projectional distribution toward the other end thereof, where said positions numbering u spaced apart from each other for measurement of the values $d_k$ of X-ray density are selected according to the following two criteria: (i) that the tomographic plane of the X-ray tested tissue of a body to be reconstructed is expressed by a pseudo-tomographic plane which is constituted collectively by mn pieces of picture elements, with m pieces of picture elements in a row and n in a column (both m and n are natural numbers), which are formed by dividing said tomographic plane of the X-ray tested tissue of a body into small sections and each of which has a single piece of X-ray density information, and that said pseudo-tomographic plane is placed between an X-ray source and said single X-ray projectional distribution, (ii) that n rows, each of which is constituted by m pieces of picture elements are numbered in order 1,2, ..., n from the left and that said m pieces of picture elements in each row are numbered respectively 1,2, ..., m; m+1, m+2, ..., 2m, ...; (n−1)m+1, (n−1)m+1, (n−1)m+2, ..., mn from the side of said X-ray source toward the side of said single X-ray projectional distribution in order and that each of X-ray beams numbering mn passing through said pseudo-tomographic plane passes through a left lower corner of a corresponding picture element of said mn picture elements, said positions numbering u spaced apart from each other on the single X-ray projectional distribution for measurement of the values $d_k$ of X-ray density correspond to the positions on said single X-ray projectional distribution which have X-ray density information to be obtained by the first u X-ray beams' passing through said pseudo-tomographic plane based on criteria (i) and (ii);

(b) calculating the X-ray absorption coefficient (t=1,2, ..., u, t is natural number) of each of u pieces of picture elements based on the values $d_k$ of X-ray density measured in step (a) and the length of the X-ray beams passing through each picture element in accordance with the following equations:

$$L\mu = D$$

where $$\mathbb{L} = \alpha \begin{bmatrix} 1 & & & & & & & \\ 1 & 1 & & & & & & \\ 1 & 1 & 1 & & & 0 & & \\ \cdot & \cdot & \cdot & & & & & \\ \cdot & \cdot & \cdot & & & & & \\ \cdot & \cdot & \cdot & \cdot & \cdot & \cdot & \cdot & \\ 1 & 1 & 1 & 1 & 1 & 1 & 1 & 1 \end{bmatrix}$$

and where $$\mu = (\mu_1, \mu_2, \mu_3, \ldots, \mu_u)^T$$

$$D = (d_1, d_2, d_3, \ldots, d_u)^T$$

L is a square matrix of u×u, T indicates a matrix transpose and $\alpha$ is a length of X-ray beam passing through each picture element;

(c) memorizing the X-ray absorption coefficients $\mu_1$, $\mu_2$, ..., $\mu_u$ calculated in Step (b);

(d) measuring each of the values $d_k$ (k=u+1, u+2, ..., 2u, k is natural number) of X-ray density on said single X-ray projectional distribution at the positions numbering u spaced apart from each other from the (u+1) position from the one end of said projectional distribution toward the other end thereof, where said positions numbering u spaced apart from each other for measurement of the values $d_k$ of X-ray density are selected such that said positions numbering u spaced apart from each other on the single X-ray projectional distribution for measurement of the values $d_k$ of X-ray density correspond to the positions on said single X-ray projectional distribution which have X-ray density information to be obtained as a result of the u X-ray beams passing through the left lower corner of each of the respective (u+1) to 2u picture elements passing through said pseudo-tomographic plane based on the two criteria in step (a);

(e) calculating the X-ray absorption coefficients $\mu_t$ (t=u+1, u+2, ..., 2u) based on the X-ray absorption coefficients $\mu_1 \sim \mu_u$ calculated in step (b), the values $d_k$ (k=u+1, u+2, ..., 2u) of X-ray density measured in step (d), and length of X-ray beams passing through the (u+1) to 2u picture elements, where the method of calculating the X-ray absorption coefficients $\mu_{u+1} \sim \mu_{2u}$ is the same as the step (b) and the X-ray absorption coefficients $\mu_1 \sim \mu_u$ calculated in step (b) are selectively used;

(f) memorizing the X-ray absorption coefficients $\mu_{u+1}, \mu_{u+2}, \ldots, \mu_{2u}$ calculated in step (e);

(g) calculating the X-ray absorption coefficients $\mu_{2u+1} \sim \mu_{3u}$, $\mu_{3u+1} \sim \mu_{4u} \cdots$, $\mu_{(n-1)u+1} \sim \mu_{mn}$ repeating substantially the same steps as steps (d), (e) and memorizing them, where the X-ray absorption coefficients $\mu_{u+1} \sim \mu_{2u}$ calculated in steps (d), (e) and (f) are replaced by $\mu_{xu+1} \sim \mu_{(x+1)u}$ (x is natural number $\geq 2$);

(h) reconstructing the computed tomographic image of X-ray tested tissue of a body based on the X-ray absorption coefficients $\mu_1 \sim \mu_u$, $\mu_{u+1} \sim \mu_{2u}$, $\mu_{2u+1} \sim \mu_{mn}$ memorized respectively in steps (c), (f) and (g), where the picture elements having respective X-ray absorption coefficients $\mu_1, \mu_2, \ldots \mu_{mn}$ are positioned at the locations of said picture elements number 1, 2, ..., mn of the pseudo-tomographic plane and wherein the complete collection of picture elements located in the m+n array constitute the reconstructed computed tomographic plane of the X-ray tested tissue of a body.

6. A reconstruction method of a computed tomographic image from a single X-ray projection comprising:

(a) measuring each of the values $d_k$ (k=1, 2, ..., mn+m−1) of X-ray density on a single X-ray projectional distribution produced by projecting X-rays from a desired direction toward X-ray tested tissue of a body at positions numbering (mn+m−1) spaced apart from each other from one end of said projectional distribution toward the other end thereof, where said positions numbering (mn+m−1) spaced apart from each other for measurement of the values $d_k$ of X-ray density are selected according to the following two criteria: (i) that the tomographic plane of the X-ray tested tissue of a body to be reconstructed is expressed by a pseudo-tomographic plane which is constituted collectively by mn pieces of picture elements, with m pieces of picture elements in a row and n in a column (both m and n are natural numbers), which are formed by dividing said tomographic plane of the X-ray tested tissue of a body into small sections and each of which has a single piece of X-ray density information, and that said pseudo-tomographic plane is placed between an X-ray source and said single X-ray projectional distribution, (ii) that n rows, each of which is constituted by m pieces of picture elements are numbered in order 1, 2, ..., n from the left and that said m pieces of picture elements in each row are numbered respectively 1, 2, ..., m; m+1, m+2, ..., 2m; ...; (n−1)m+1, (n−1)m+2, ..., mn from the side of said X-ray source toward the side of said single X-ray projectional distribution in order and that a plurality of X-ray beams passing through said pseudo-tomographic plane are constituted by X-ray beams numbering mn, each of which passes through a left lower corner of a corresponding picture element of said mn picture elements and X-ray beams numbering (m−1), each of which passes through the picture elements in the n-th row, said positions numbering (mn+m−1) spaced apart from each other on the single X-ray projectional distribution for measurement of the valued $d_k$ of X-ray density correspond to the positions on said single projectional distribution of X-ray which have X-ray density information to be obtained by said X-ray beams' passing through said pseudo-tomographic plane based on criteria (i) and (ii);

(b) calculating the X-ray absorption coefficient $\mu_t$ (t=1,2,3, ..., mn, and t is natural number) of each of the mn pieces of picture elements based on the values $d_k$ of X-ray density measured in step (a) and the length of the X-ray beams passing through each picture element in accordance with the following equations:

$$L^T L \mu = L^T D$$

where $$L = \alpha \left\{ \begin{bmatrix} 1 & 0 & 0 & 0 & 0 \\ 1 & 1 & 0 & & 0 \\ 1 & 1 & 1 & 0 & 0 \\ & & & & 0 \\ & \cdot & & & \cdot \\ & \cdot & & & \cdot \\ & 1 & & & \cdot \\ 0 & 1 & & & \cdot \\ & & 0 & 1 & \\ & & 1 & 0 & \\ & & & 1 & \\ & \cdot & & & \\ & \cdot & & & \\ 0 & & & & 1 \\ 0 & & & 0 & 1 \\ 0 & & 0 & 1 & 1 \\ 0 & 0 & 0 & 0 & 1 \end{bmatrix} \right\}_m$$

and where
$$\mu = (\mu_1, \mu_2, \mu_3, \ldots, \mu_{mn})^T$$
$$D = (d_1, d_2, d_3, \ldots d_{mn+m-1})^T$$

L is a band matrix of $(mn+m-1) \times mn$, T indicates a matrix transpose and $\alpha$ is a length of X-ray beam passing through each picture element;

(c) reconstructing the computed tomographic image of said X-ray tested tissue of a body, where the picture elements having respectively X-ray absorption coefficients $\mu_1, \mu_2, \ldots, \mu_{mn}$ calculated in step (b) are positioned at the locations of said picture elements numbered 1,2,..., mn of the pseudo-tomographic plane and wherein the complete collection of picture elements located in the m×n array constitute the reconstructed computed tomographic plane of the X-ray tested tissue of a body.

7. A reconstruction method of a computed tomographic image from a single X-ray projection comprising:

(a) measuring each of the values $d_k$ (k=1,2,..., $v_1$, $v_1$ is natural number) of X-ray density on a single X-ray projectional distribution produced by projecting X-rays from a desired direction toward X-ray tested tissue of a body at positions numbering $v_1$ spaced apart from each other from end of said projectional distribution toward the other end thereof, where said positions numbering $v_1$ spaced apart from each other for measurement of the values $d_k$ of X-ray density are selected according to the following two criteria: (i) that the tomographic plane of the X-ray tested tissue of a body to be reconstructed is expressed by a pseudo-tomographic plane which is constituted collectively by mn pieces of picture elements, with m pieces of picture elements in a row and n in a column (both of m and n are natural numbers), which are formed by dividing said tomographic plane of the X-ray tested tissue of a body into small sections and each of which has a single pieces of X-ray density information and that said pseudo-tomographic plane is placed between an X-ray source and said single X-ray projectional distribution, (ii) that n rows, each of which is constituted by m pieces of picture elements are number in order 1,2, ..., n from the left and that said m pieces of picture elements in each row are numbered respectively 1,2, ..., m; m+1, m+2, ..., 2m; ...; (n−1)m+1, (n−1)m+2, ..., mn from the side of said X-ray source toward the side of said single X-ray projectional distribution in order and that a plurality of X-ray beams passing through said pseudo-tomographic plane are constituted by X-ray beams numbering mn, each of which passes through a left lower corner of a corresponding picture element of said mn picture elements and X-ray beams numbering (m−1), each of which passes through the picture elements in the n-th row, said positions numbering $v_1$ spaced apart from each other on the single X-ray projectional distribution for measurement of the values $d_k$ of X-ray density correspond to the positions on said single X-ray projectional distribution which have X-ray density information to be obtained by the first $v_1$ X-ray beams' passing through said pseudo-tomographic plane based on criteria (i) and (ii);

(b) calculating the X-ray absorption coefficients $\mu_t$ (t=1,2,3,..., u, u<$v_1$, u is natural number) of each of the u pieces of picture elements based on the values $d_k$ of X-ray density measured in step (a) and the length of the X-ray beams passing through each picture element in accordance with the following equations:

$$L^T L \mu = L^T D$$

where $$L = \alpha \left\{ m \begin{bmatrix} 1 & 0 & 0 & \cdots & & & 0 & 0 & 0 \\ 1 & 1 & 0 & & & & & & 0 \\ 1 & 1 & 1 & 0 & & & & & 0 \\ \vdots & & & \ddots & & & & & \vdots \\ 1 & & & & & & & & \\ 0 & 1 & & & & & & & \\ \vdots & \ddots & & & & & & & \\ & & & & & & 0 & 0 \\ & & & & & 1 & & 1 & 0 \\ 0 & \cdots & & 0 & 1 & 1 & 1 & \cdots & 1 & 1 \end{bmatrix} \right\}$$

$$\mu = (\mu_1, \mu_2, \mu_3, \ldots, \mu_n)^T$$

$$D_{Q_{Q_1}} = (d_1, d_2, d_3, \ldots d_{v_1})^T$$

L is a band matrix of u×v, T indicates a matrix transpose and α is a length of the X-ray beam passing through each picture element;

(c) memorizing the X-ray absorption coefficients $\mu_1, \mu_2, \ldots, \mu_u$ calculated in step (b);

(d) measuring each of the values $d_k$ (k=u+1, u+2, ..., u+1+v_2$, k is natural number) at the positions numbering $v_2$ ($v_2$ is natural number, and $v_2 > u$) spaced apart from each other from the (u+1) position from the one end of said projectional distribution toward the other end thereof, where said positions numbering $v_2$ spaced apart from each other for measurement of the values $d_k$ of X-ray density are selected such that said positions numbering $v_2$ spaced apart from each other on the single X-ray projectional distribution for measurement of the values $d_k$ of X-ray density correspond to the positions on said single X-ray projectional distribution which have X-ray density information to be obtained as a result of the $v_2$ X-ray beams passing through the left lower corner of each of the respective (u+1) to (u+1+v_2) picture elements passing through said pseudo-tomographic plane based on the above-mentioned criteria in step (a);

(e) calculating the X-ray absorption coefficients $\mu_t$ (t=u+1, u+2, ... 2u) based on the X-ray absorption coefficients $\mu_1 \sim \mu_u$ calculated in step (b), the values $d_k$ (k=u+1, u+2, ..., u+1+v_2$) of X-ray density measured in step (d), and the length of the X-ray beams passing through the (u+1) to (u+1+v_2) picture elements, where the method of calculating the X-ray absorption coefficients $\mu_{u+1} \sim \mu_{2u}$ is the same as in step (b) and the X-ray absorption coefficients $\mu_1 \sim \mu_u$ calculated in step (b) are selectively used;

(f) memorizing the X-ray absorption coefficients $\mu_{u+1}, \mu_{u+2}, \ldots, \mu_{2u}$ calculated in step (e);

(g) calculating the X-ray absorption coefficient $\mu_{2u+1} \sim \mu_{3u}, \mu_{3u+1} \sim \mu_{4u}, \ldots, \mu_{(n-1)u+1} \sim \mu_{mn}$ repeating substantially the same steps as steps (d), (e) and (f) and memorizing them, where $\mu_{u+1} \sim \mu_{2u}$ in steps (d), (e) and (f) are replaced by $\mu_{xu+1} \sim \mu_{(x+1)u}$ (x is natural number $\geq 2$);

(h) reconstructing the computed tomographic image of said X-ray tested tissue of a body based on the X-ray absorption coefficients $\mu_1 \sim \mu_u, \mu_{u+1} \sim \mu_{2u}, \ldots, \mu_{(n-1)u+1} \sim \mu_{mn}$ memorized respectively in steps (c), (f) and (g), where the picture elements having respective X-ray absorption coefficients $\mu_1, \mu_2, \ldots, \mu_{mn}$ are positioned at the locations of said picture elements numbered 1, 2, ..., mn of the pseudo-tomographic plane and wherein the complete collection of picture elements located in the m×n array constitute the reconstructed computed tomographic plane of the X-ray tested tissue of a body.

8. A reconstruction method of a computed tomographic image from a single X-ray projection according to claim 7, wherein the number $v_1$ of said measurement values to be used when the X-ray absorption coefficients $\mu_1 \sim \mu_u$ of each of the picture elements is calculated, the number $v_2$ of said measurement values to be used when the X-ray absorption coefficient $\mu_{u+1} \sim \mu_{2u}$ of each of the picture elements is calculated, and the numbers of measurement values to be used respectively when the X-ray absorption coefficient $\mu_{2u+1} \sim \mu_{3u}, \mu_{3u+1} \sim \mu_{4u}, \ldots, \mu_{(n-1)u+1} \sim \mu_{mn}$ of each of the picture elements is calculated, are equal to each other.

* * * * *